(12) United States Patent
Takagi

(10) Patent No.: US 6,913,058 B1
(45) Date of Patent: Jul. 5, 2005

(54) METHOD AND DEVICE FOR PRODUCING BODY PLY MATERIAL FOR PNEUMATIC TIRES

(75) Inventor: Shigemasa Takagi, Gifu (JP)

(73) Assignee: Fuji-Seiko Co., Ltd. (JP)

( * ) Notice: Subject to any disclaimer, the term of this patent is extended or adjusted under 35 U.S.C. 154(b) by 244 days.

(21) Appl. No.: 10/070,492

(22) PCT Filed: Sep. 7, 2000

(86) PCT No.: PCT/JP00/06110

§ 371 (c)(1),
(2), (4) Date: Mar. 7, 2002

(87) PCT Pub. No.: WO01/17760

PCT Pub. Date: Mar. 15, 2001

(30) Foreign Application Priority Data

Sep. 7, 1999 (JP) .............................. 11-253083
Sep. 7, 2000 (JP) ....................... 2000-271153

(51) Int. Cl.$^7$ .............................................. B29D 30/38
(52) U.S. Cl. ........................ 156/397; 156/117; 156/174; 156/193; 156/427
(58) Field of Search ................................ 156/174, 117, 156/133, 193, 397, 408, 426, 427; 57/2.3, 295, 297, 1 UN; 242/562

(56) References Cited

U.S. PATENT DOCUMENTS

| | | | | |
|---|---|---|---|---|
| 885,219 A | * | 4/1908 | Bayne | 138/130 |
| 1,337,690 A | * | 4/1920 | Converse et al. | 156/174 |
| 1,422,451 A | * | 7/1922 | Krusemark | 156/174 |
| 1,938,787 A | * | 12/1933 | Abbott, Jr. | 156/406.4 |
| 3,682,222 A | | 8/1972 | Alderfer | |
| 3,751,316 A | | 8/1973 | Menough et al. | |
| 4,126,720 A | * | 11/1978 | Edwards | 442/377 |
| 4,824,515 A | * | 4/1989 | Still et al. | 156/406.4 |
| 5,192,390 A | * | 3/1993 | Perkins | 156/425 |

FOREIGN PATENT DOCUMENTS

| | | |
|---|---|---|
| EP | 537780 | 4/1993 |
| EP | 0 724 951 A2 | 8/1996 |
| EP | 0 724 951 A3 | 3/1997 |
| EP | 927629 | 7/1999 |
| GB | 960488 * | 6/1964 |
| JP | 35-18602 | 12/1960 |
| JP | 5-309761 | 11/1993 |
| JP | 10-217353 | 8/1998 |
| JP | 10-217354 | 8/1998 |
| JP | 2000-202925 | 7/2000 |

* cited by examiner

*Primary Examiner*—Geoffrey L. Knable
(74) *Attorney, Agent, or Firm*—Caesar, Rivise, Bernstein, Cohen & Pokotilow, Ltd.

(57) ABSTRACT

The peripheral length (M) dimension of the outer peripheral surface of drums (35, 36) is set equal to the width (W) dimension of body ply materials (46A, 46B) used for tires or integral multiples thereof. The wrapping length (L) of the wrapper (40) in the direction of the length of the drum is set equal to the length dimension (L1) of the body ply materials (46A, 46B) used for tires. A ribbon (39) of predetermined width dimension in the form of a cord having a rubber covering applied thereto is produced. The ribbon (39) is spirally wound on the outer peripheral surface of the drums (35, 36) and the lateral edges of the ribbon are bonded together, thus producing the wrapper (40). The wrapper (40) is cut along a gentle curve which is substantially orthogonal to the direction of the length of the ribbon, thus providing the body ply materials (46A, 46B).

14 Claims, 21 Drawing Sheets

M: Peripheral Length Dimension of Drum35(36)

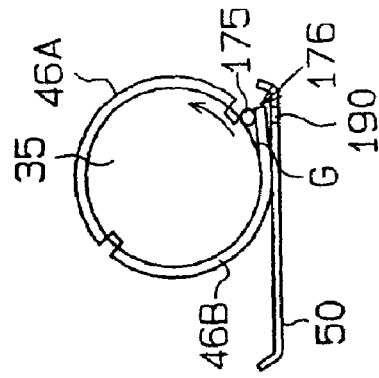
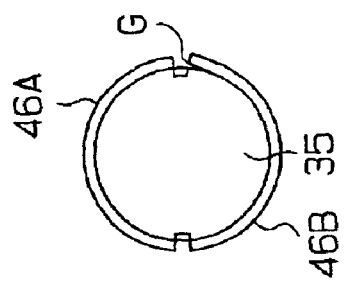
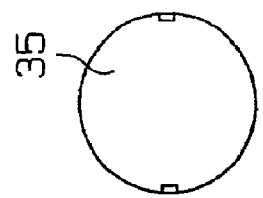
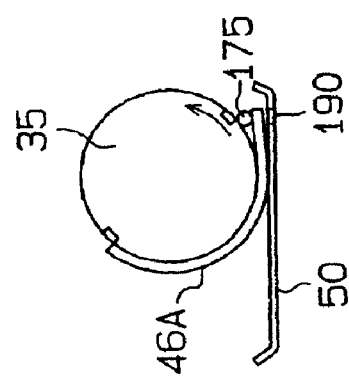
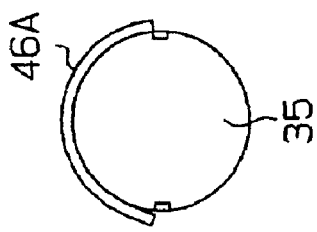

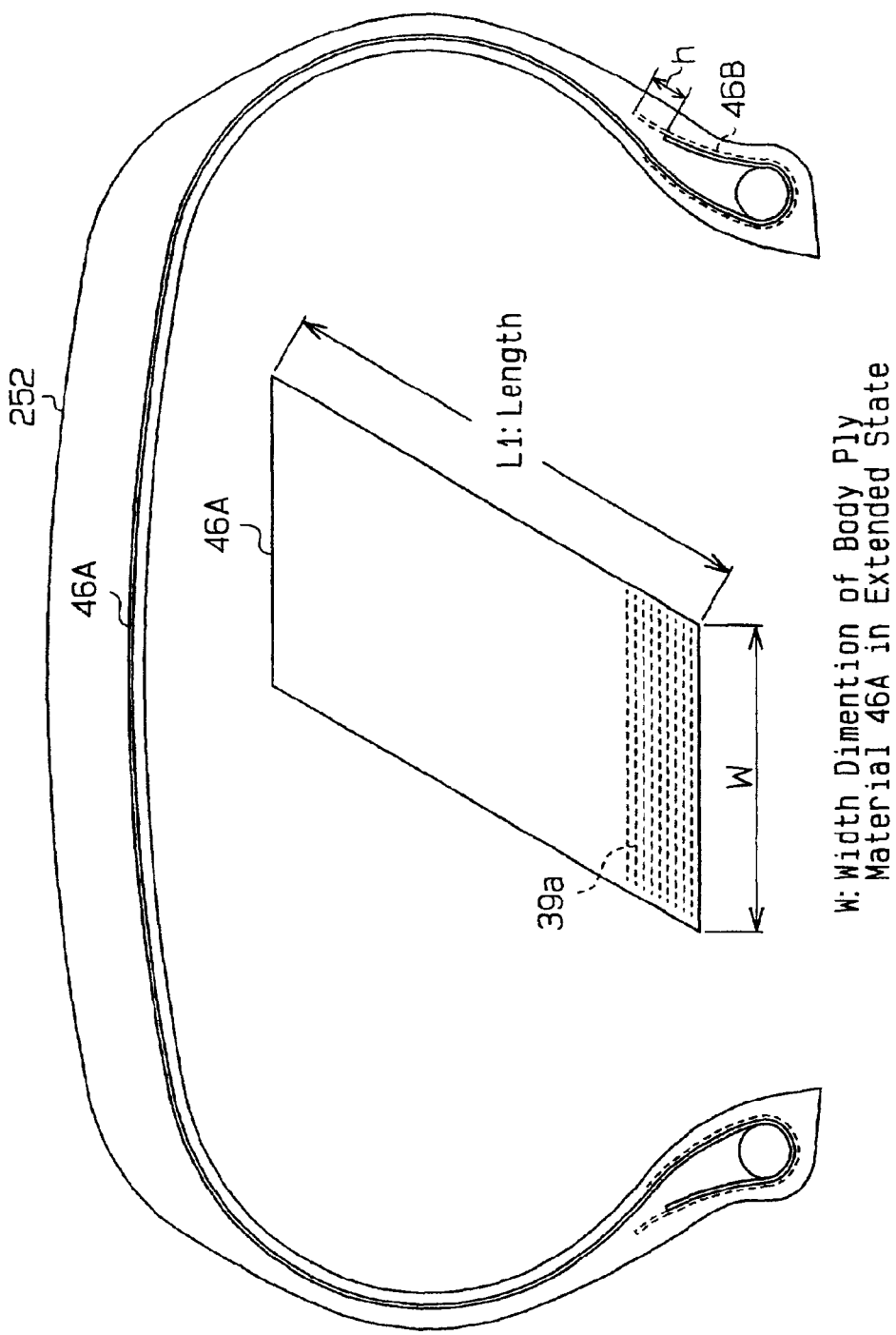

METHOD AND DEVICE FOR PRODUCING BODY PLY MATERIAL FOR PNEUMATIC TIRES

BACKGROUND OF THE INVENTION

This invention relates to a method and device for producing a body ply material for use in, for example, a carcass of a pneumatic radial tire.

A conventional device for producing a body ply material is shown in Japanese Examined Patent Publication No. 35-18602. This producing device involves winding back several filaments from reels by an extruder, arranging them in parallel with each other, passing the filaments in unvulcanized rubber within the extruder, and extruding them in a predetermined width by a dice to manufacture a ribbon. The ribbon is spirally wound on a drum of a large diameter, while lateral edges are bonded to each other to form a cylindrical wrapper. Then, the wrapper is cut in parallel with the axial line of the drum to manufacture a sheet having a large area. This sheet is peeled from the drum and temporarily stored, or transported to a cutting machine for cutting the sheet into a large number of body ply materials in a predetermined shape.

However, in the conventional producing device, after a large sheet is manufactured by the drum, the sheet is transported to a separate sheet cutting machine which cuts the sheet into a large number of pieces to produce body ply materials. Therefore, a ribbon winder having a large drum, and a sheet cutting machine are required, thereby giving rise to a problem that a large space is required not only for installing both machines, but also for storing sheets of large area.

Also, since continuous winding of ribbon and cutting of cylindrical wrapper are performed on the drum shaft of one cylinder at the same place, the sheet manufacturing efficiency is reduced to cause another problem that a manufacturing cost for the body ply materials cannot be reduced.

Since the work for manufacturing a wrapper with a ribbon and cutting the wrapper into a sheet, and the work for cutting the sheet peeled from the drum are performed in separation, the work efficiency is reduced, so that from this aspect, the reduction in cost cannot be accomplished for the body ply materials.

There is a problem that a sufficient bonding force cannot be ensured for adjacent lateral edges of a continuously wound ribbon.

In addition, after the wrapper is cut, the operator must forcedly peel the cut sheet from the drum, so that a problem arises in that the sheet peeling operation is troublesome.

Conventionally, tires have been produced through mass production pointing. For example, in regard to body ply materials, wide and long sheets are successively fabricated, cut into a large number of sheets of predetermined dimensions, and stored as body plies. The stored body ply materials are delivered to the next process. In other words, large shape sheets are fabricated, and cut into body plies for use in the manufacturing of tires.

Apparently, the foregoing mass production system seems to be capable of efficiently manufacturing tires. However, since the mass production system involves manufacturing large sized sheets, and cutting the sheets into tire parts, not only large scaled manufacturing devices and cutting device are required for the sheets, but also a space for storing sheets are required. For this reason, a vast space is required for the factory, and immense energy is also required for operating the factory. Therefore, even if the mass production is oriented, the production cost is increased as a result, thereby failing to benefit from the merit of the mass production. Particularly, when a tire part manufacturing factory is separated from a tire forming factory due to restrictions on geographical conditions, a cost for storing and transporting tire parts accounts for a large proportion of a total cost, so that a reduction in the cost is extremely difficult. Further, since the storage of tire parts, and a transport process intervene between working processes, a variety of difficulties are involved in the quality management for the humidity, curing of sheet surfaces, prevention of dust adherence, and so on, thereby giving rise to a problem of a reduced yield of tire products.

This invention has been made in view of the problems inherent in the prior art as described. Its main object is to provide a method and device for producing a body ply material which is capable of significantly reducing a space for installing the body ply material producing device, and of eliminating a space for storing intermediates of the body ply materials.

It is another object of this invention to provide a method and device for producing a body ply material which is capable of reducing a producing cost, in addition to achieving the main object.

It is another object of this invention to provide a method and device for producing a body ply material which is capable of increasing a bonding force of adjacent lateral edges of a ribbon which is successively wound.

It is another object of this invention to provide a device for producing a body ply material which is capable of smoothly peeling a cut body ply material from the outer periphery of a drum, in addition to achieving the main object.

BRIEF SUMMARY OF THE INVENTION

To solve the above problems, the present invention is characterized by comprising the steps of manufacturing a ribbon of a predetermined width dimension in the form of a cord having a rubber covering applied thereto, spirally winding the ribbon on an outer peripheral surface of a drum, and bonding lateral edges of the ribbon to each other to manufacture a wrapper, setting a peripheral length dimension of the outer peripheral surface of the drum to the same as or integral multiples of a width dimension of body ply materials for use in a tire, and setting a winding length in a drum longitudinal direction of the wrapper equal to a length dimension of the body ply materials for use in a tire.

In the present invention, after the step of manufacturing the wrapper, the wrapper on one drum may be cut at one location in the longitudinal direction of the drum to produce a body ply material for one tire.

In the present invention, the wrappers on a plurality of drums different in the peripheral length dimension may be cut at one location in the longitudinal directions of the drums, respectively, to produce two body ply materials different in width dimension for use in one tire.

In the present invention, after the step of manufacturing a wrapper, the wrapper on one drum may be cut at two locations in the longitudinal direction of the drum to produce two body ply materials for use in one tire.

In the present invention, the wrapper may be cut at two locations such that two body ply material differs in the width dimension from each other.

In the present invention, a finish end of the ribbon wound on the drum may be cut at a right angle to the longitudinal direction of the ribbon.

In the present invention, the wrapper may be cut along a gentle curve which is substantially orthogonal to the longitudinal direction of the ribbon wound on the drum.

In the present invention, the wrapper may be cut along the gentle curve, which passes a winding start end and a winding finish end of the ribbon.

The present invention is characterized by a device which includes a ribbon manufacturing device for manufacturing a ribbon of a predetermined width dimension in the form of a cord having a rubber covering applied thereto, a ribbon winding mechanism for spirally winding the ribbon on an outer peripheral surface of a drum, and a bonding mechanism for bonding lateral edges of the ribbon to manufacture a wrapper, wherein a peripheral length dimension of the outer peripheral surface of the drums is set to the same as or integral multiples of a width dimension of body ply materials for use in a tire, and a winding length in a drum longitudinal direction of the wrapper is set equal to a length dimension of the body ply materials for use in a tire.

In the present invention, the device may comprise a wrapper cutting mechanism for cutting the wrapper along a gentle curve which is substantially orthogonal to the longitudinal direction of the ribbon to form body ply materials of a predetermined width dimension.

In the present invention, the ribbon winding mechanism may comprise a ribbon winding guide corresponding to the drums rotatably supported by frames, and a relative movement mechanism for relatively moving the drums and the ribbon winding guide in an axial direction of the drums at a predetermined feed speed.

In the present invention, start end holding mechanisms capable of holding a winding start end of the ribbon may be provided for the drums.

In the present invention, the ribbon winding mechanism may comprise a ribbon cutting mechanism for cutting a winding finish end of the ribbon wound on the drum.

In the present invention, the wrapper cutting mechanism comprises a cutter disposed corresponding to the drums for movements into contact with and away from the drums, and a moving mechanism for moving the cutter along a gentle curve which is substantially orthogonal to the longitudinal direction of the ribbon wound on the drum, while holding the drums in a non-rotating state.

In the present invention, the wrapper cutting mechanism may be configured to move the cutter disposed corresponding to the drums for movements into contact with and away from the drums in a direction parallel with the axial direction of the drums, and slowly pivoting the drums to cut the wrapper along the gentle curve which is substantially orthogonal to the longitudinal direction of the ribbon wound on the drum.

In the present invention, blade grooves may be provided in the outer peripheral surfaces of the drums for cutting the wrapper along a gentle curve which is substantially orthogonal to the longitudinal direction of the ribbon wound on the drum, wherein a blade edge of the cutter may be guided by one edge of the blade groove to cut the wrapper.

In the present invention, the frame comprises a body ply material peeling mechanism for peeling the body ply material from the drum.

In the present invention, the frame may comprise a tray for receiving and supporting a body ply material peeled from the drum, and the tray may be transported to a direction intersecting the axial line of the drum by a tray transporting mechanism.

In the present invention, the body ply material peeling mechanism may be configured to peel the body ply material from the drum in a rotating state, while transferring the body ply material on the tray which is moving in a transporting direction.

In the present invention, the drums may be disposed at a plurality of locations, and each of the drums is configured to be switchable among a ribbon winding position, a ribbon bonding position, a wrapper cutting position, and a body ply material peeling position by a position switching mechanism.

In the present invention, the drums comprise a drum diameter changing mechanism for enlarging and reducing outer diameters thereof.

In the present invention, the device may comprise a drum reversing/supporting mechanism for rotatably supporting the pair of drums having the same outer diameter, and formed with blade grooves, and functioning as a position switching mechanism for alternately reversing the drums to two positions, wherein a ribbon is wound on the outer periphery of a drum placed at one position by the drum reversing/supporting mechanism to form a wrapper, and the wrapper on the outer periphery of the drum reversed to the other position by the drum reversing/supporting mechanism is cut along the blade groove of the drum to form a body ply material.

In the present invention, the body ply material peeling mechanism comprises a peeling tool for partially peeling a cut edge of a body ply material, following cutting of the wrapper, and a rotating peeling bar introducing into a gap of the cut edge, formed by the peeling tool, to transfer the body ply material onto the tray.

In the present invention, the wrapper cutting mechanism may comprise a roller for pressing the wrapper ahead of the cutter.

In the present invention, the tray transporting mechanism may comprise a pressing force adjusting mechanism for adjusting a pressing force of the tray to the drums.

In the present invention, the ribbon winding mechanism may be configured to perform a winding operation for the drums in an outgoing stroke and a returning stroke of reciprocal movements in a direction parallel with the axial direction of the drums.

In the present invention, the ribbon may be formed by transferring a cord made of a plurality of twisted filaments through a twist-back member in the longitudinal direction to twist back the respective filaments and form predetermined spacings between the filaments, passing the cord in this state through a softened rubber to form a rubber layer over the outer periphery of each filament, and after the respective filaments return to the original twisted state by their own twisting stresses, passing a plurality of similarly fabricated cords arranged in parallel through a rubber extruder to flatly coat a rubber coating on the rubber layer of each cord.

BRIEF DESCRIPTION OF THE DRAWINGS

FIGS. 23(a) to 23(f) are explanatory diagrams showing a process of producing a body ply material.

FIG. 24 is a cross-sectional view showing a body ply material placed on a carcass layer of a tire;

DETAILED DESCRIPTION OF THE PREFERRED EMBODIMENTS

In the following, an embodiment which embodies this invention in a body ply material for a pneumatic radial tire will be described with reference to FIGS. 1 to 24.

(General Configuration of Whole Device)

Figure 1:
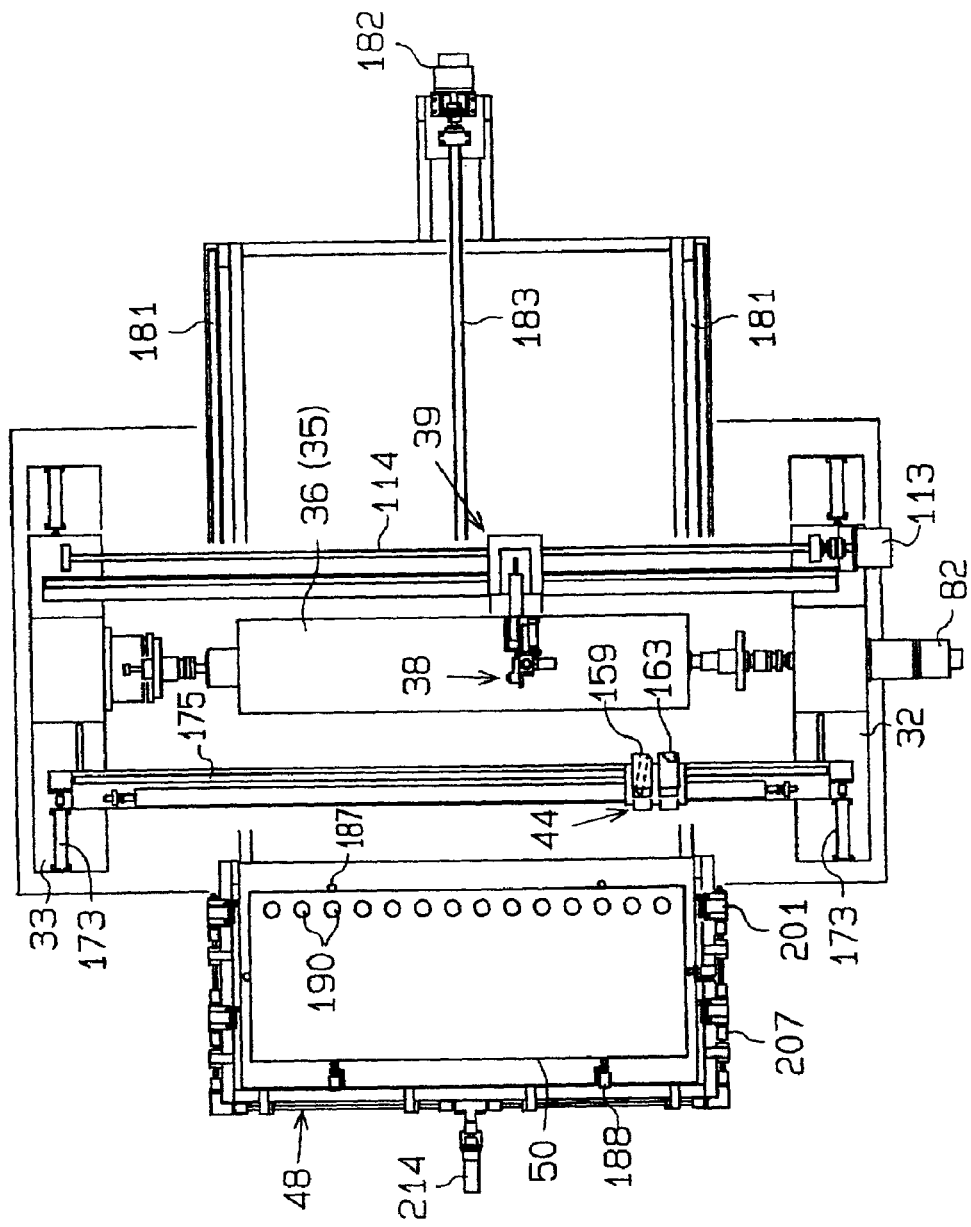
FIG. 1 is a plan view illustrating one embodiment of a device for producing a body ply material for a tire.
Figure 2:
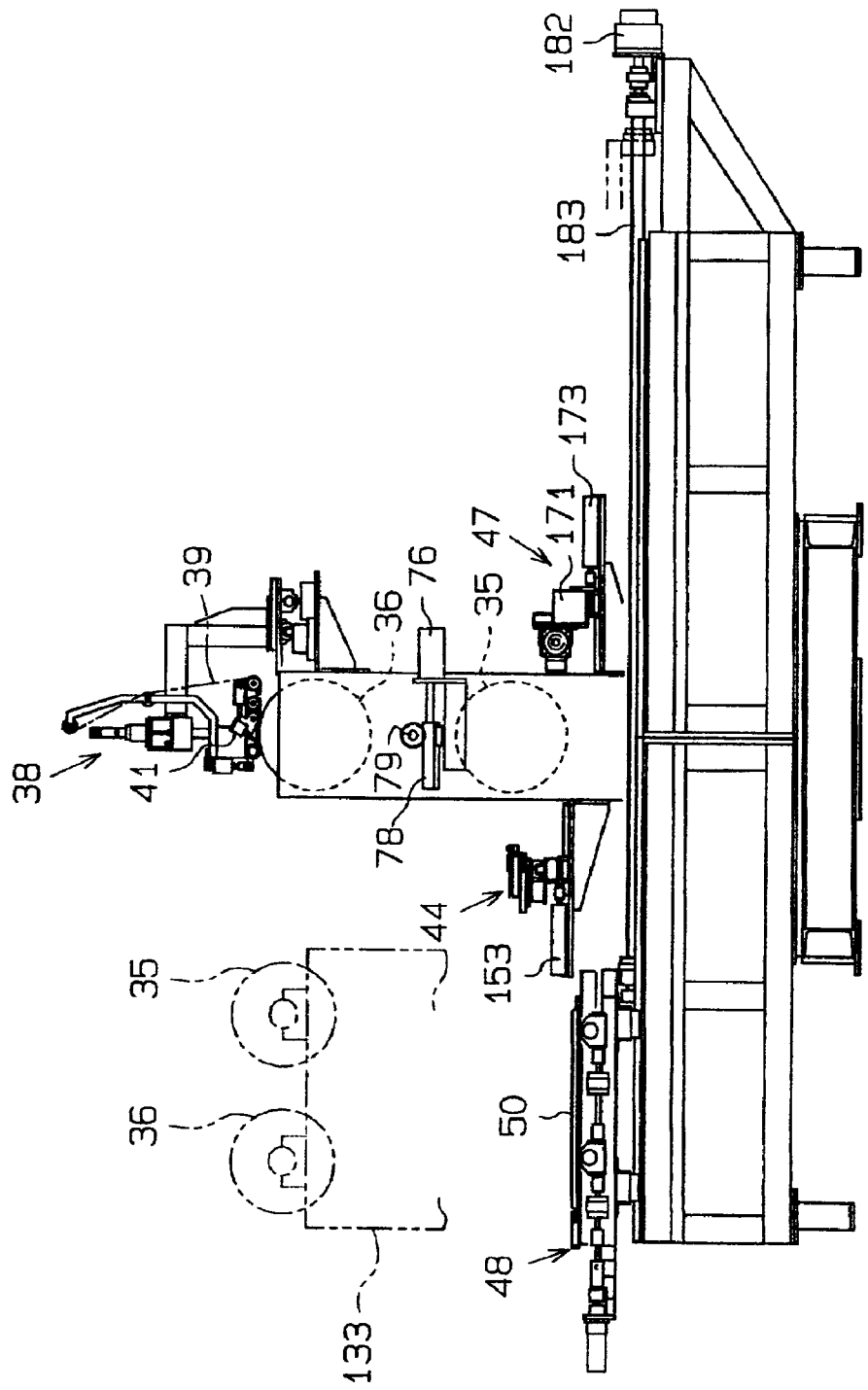
FIG. 2 is a front view of the producing device of FIG. 1.
Figure 3:
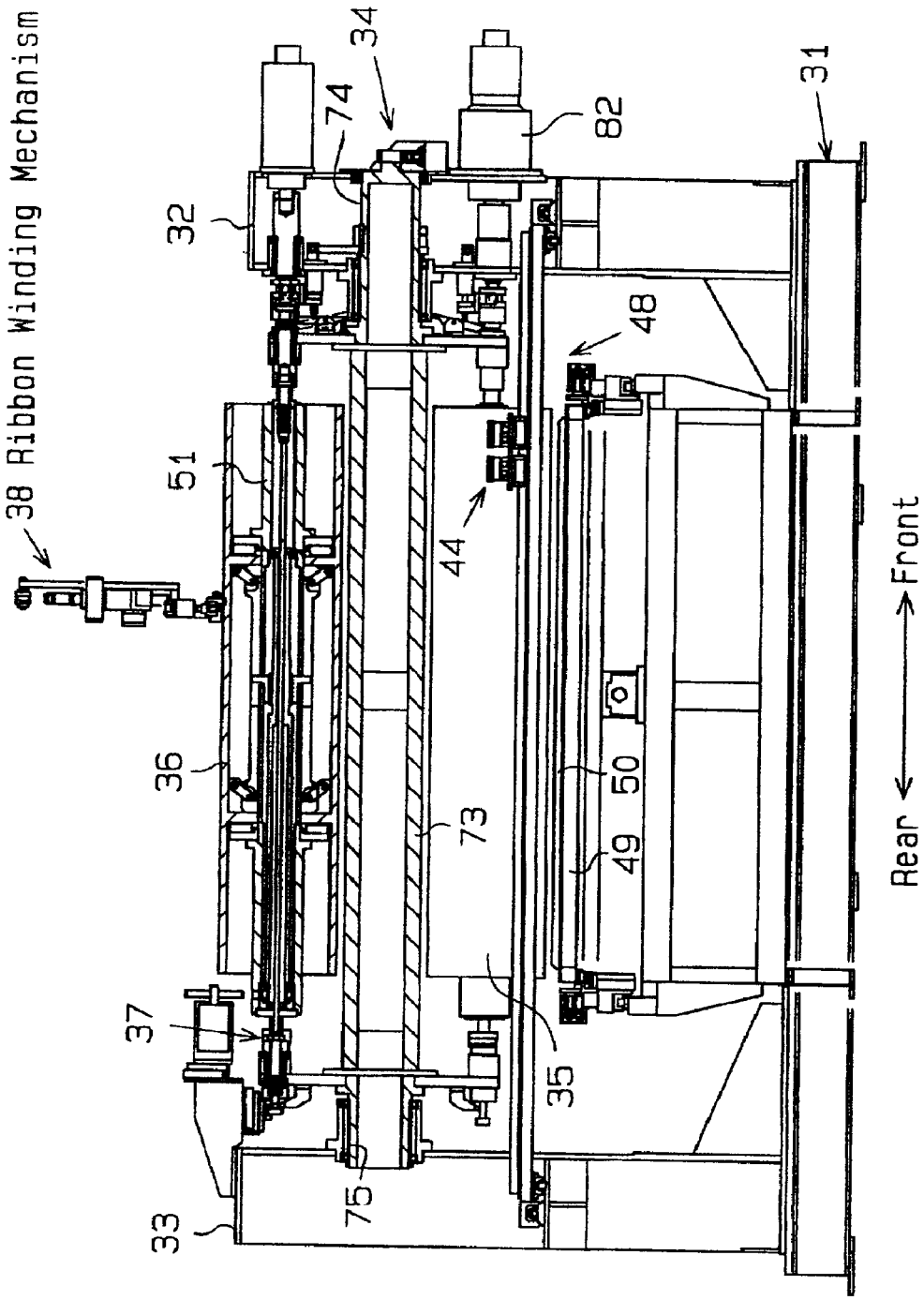
FIG. 3 is an enlarged right side sectional view illustrating the producing device of FIG. 1.

First, the overall configuration of a device for producing a body ply material according to this embodiment will be described in general. As illustrated in FIGS. 1 to 3, a base 31 is installed on a floor to extend in a right-to-left direction. A pair of frames 32, 33 are implanted in a front portion and a rear portion in a central region of the base 31. On the inner side surfaces of the respective frames 32, 33, drum reversing/supporting mechanisms 34 are disposed as drum position switching mechanisms such that they oppose each other. A pair of drums 35, 36 having the same outer diameter are rotatably and removably supported by the drum reversing/supporting mechanisms 34 through a drum clamp mechanism 37. Then, both drums 35, 36 are reversed and placed alternately at two positions, i.e., an upper position and a lower position, by the drum reversing/supporting mechanisms 34.

Figure 11:
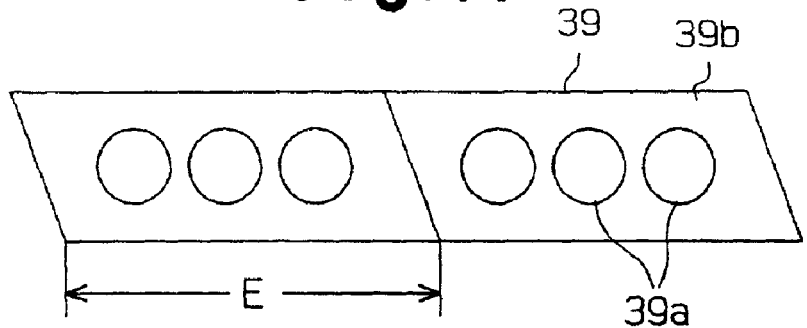
FIG. 11 is an enlarged sectional view of a ribbon.

A ribbon winding mechanism 38 is disposed between both frames 32, 33 for movements in a front-to-rear direction to correspond to an upper right direction of the drums 35, 36 supported at the upper position by the drum reversing/supporting mechanisms 34. Then, as illustrated in FIG. 12, a ribbon 39 is spirally wound by the ribbon winding mechanism 38 on the outer periphery of the drum 35, 36 placed at the upper position to form a wrapper 40. As illustrated in FIG. 11, the ribbon 39 is comprised of a plurality of linear cords 39a made of metal fiber or non-metal fiber, arranged in parallel, and unvulcanized rubber coating 39b formed over the outer periphery of the cords. The width dimension of the ribbon 39 is set, for example, to 5 to 15 mm, so that its cross-sectional shape appears to be a parallelogram.

As illustrated in FIG. 2, the ribbon winding mechanism 38 is provided with a ribbon cutting mechanism 41. Then, the ribbon winding mechanism 38 is moved to the front or rear movement end position along the drums 35, 36 at the upper position, and when the ribbon 39 has been wound on the outer periphery of the drum 35, 36, the end of the wounded ribbon 39 is cut by the ribbon cutting mechanism 41.

Figure 12A:
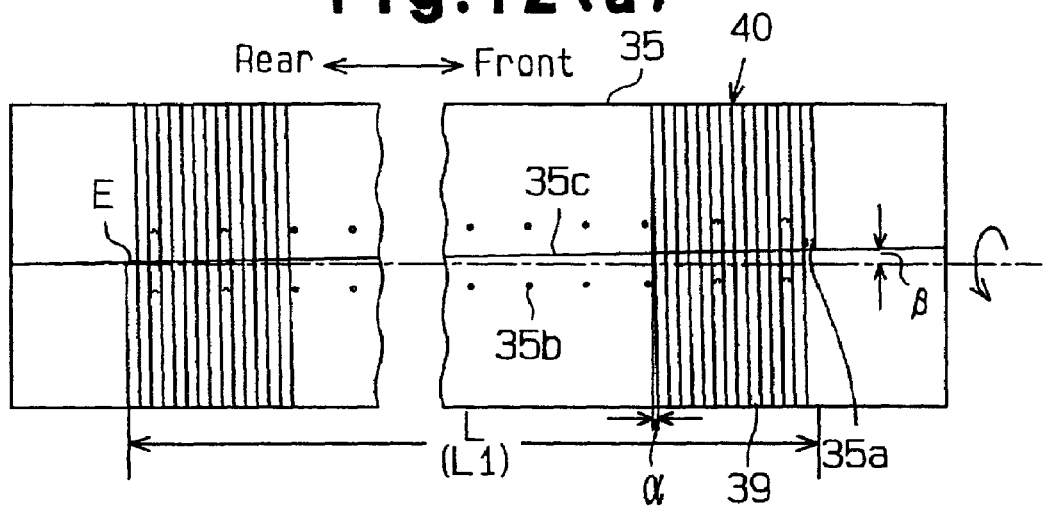
FIGS. 12(a) and (b) are enlarged front views of the drum.
Figure 13:
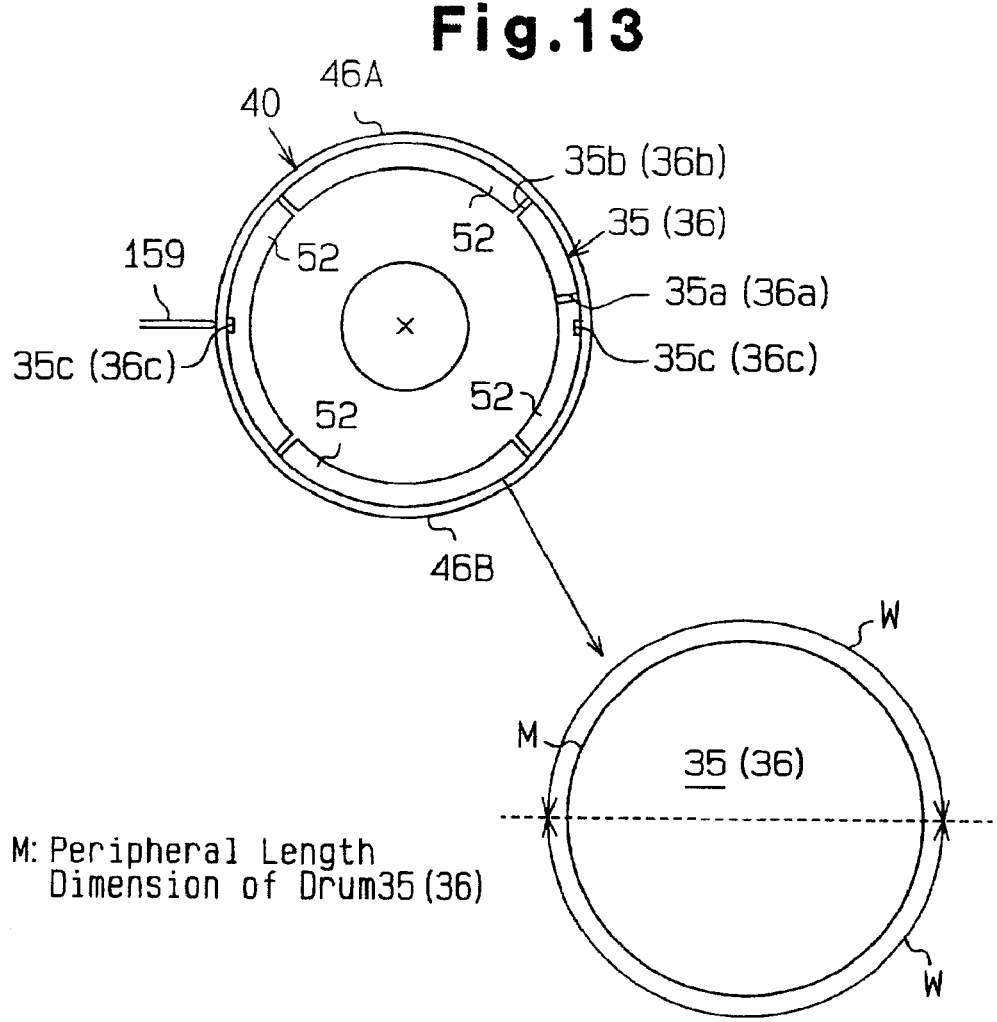
FIG. 13 is a side view of the drum.

A wrapper cutting mechanism 44 is disposed between both frames 32, 33 for movement in the front-to-rear direction to correspond to the right side of the drums 35, 36 at the lower position, supported by the drum reversing/supporting mechanism 34. The wrapper cutting mechanism 44 is provided with a cutter 159 which can engage with blade grooves 35c, 36c formed on the drums 35, 36 in the longitudinal directions of the drums as illustrated in FIGS. 12(a), (b). The cutter 159 has its blade edge pressed onto edges of the blade grooves 35c, 36c. Then, as illustrated in FIG. 13, a wrapper 40 on the drum 35, 36 is cut in a gently curved shape (corresponding to a portion of a spiral curve having an extremely large spiral pitch) along the blade groove 35c, 36c in cooperation of the cutter 159 with the blade grooves 35c, 36c. This operation is performed twice as the drums are rotated by 180 degrees to cut the wrapper to form two body ply materials 46A, 46B having a predetermined width W from a single drum 35, 36.

Figure 20:
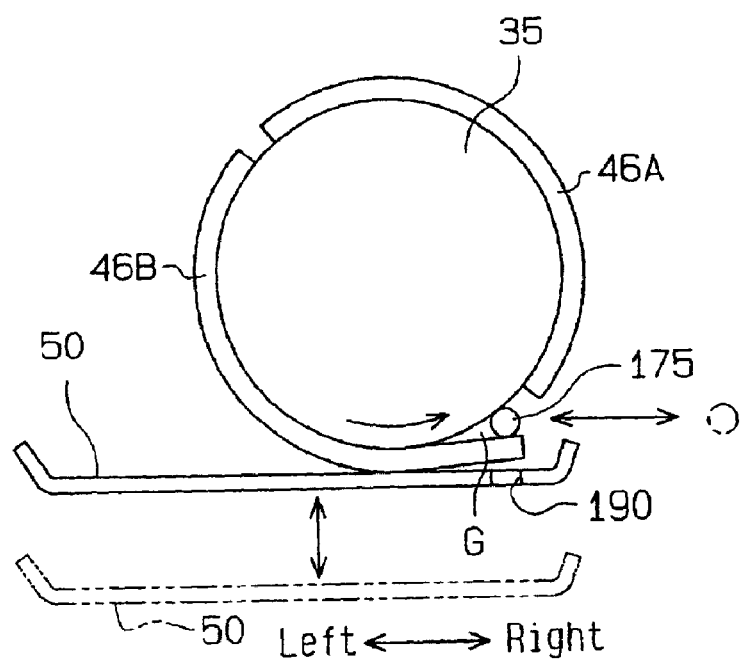
FIG. 20 is a side view for explaining the operation of peeling a body ply material.

As illustrated in FIG. 2, a body ply material peeling mechanism 47 is disposed between both frames 32, 33 to correspond to the left side of the drum 35 at the lower position, supported by the drum reversing/supporting mechanism 34. The body play material peeling mechanism 47 is provided with a rotating peeling bar 175. Then, as illustrated in FIG. 20, the cut body ply materials 46A, 46B are peeled from the outer periphery of the drum 35, 36 by the rotating peeling bar 175 of the body ply material peeling mechanism 47, and discharged on a tray 50 of a tray transporting mechanism 48, which will be described later.

The tray transporting mechanism 48 is disposed on the base 31, and the tray 50 is placed on a moving table 49 for receiving and supporting the body ply materials 46A, 46B. Then, with the movement of the moving body 49, the tray 50 is transported from the right side of the base 31 to the left side of the base 31, passing through the under side of the drum 35, thereby transferring the body ply materials 46A, 46B peeled from the outer periphery of the drum 35 onto the tray 50.

Next, the detailed structures of the drums 35, 36 and respective mechanisms will be described in order.

(Structure of Drums)

Figure 6:
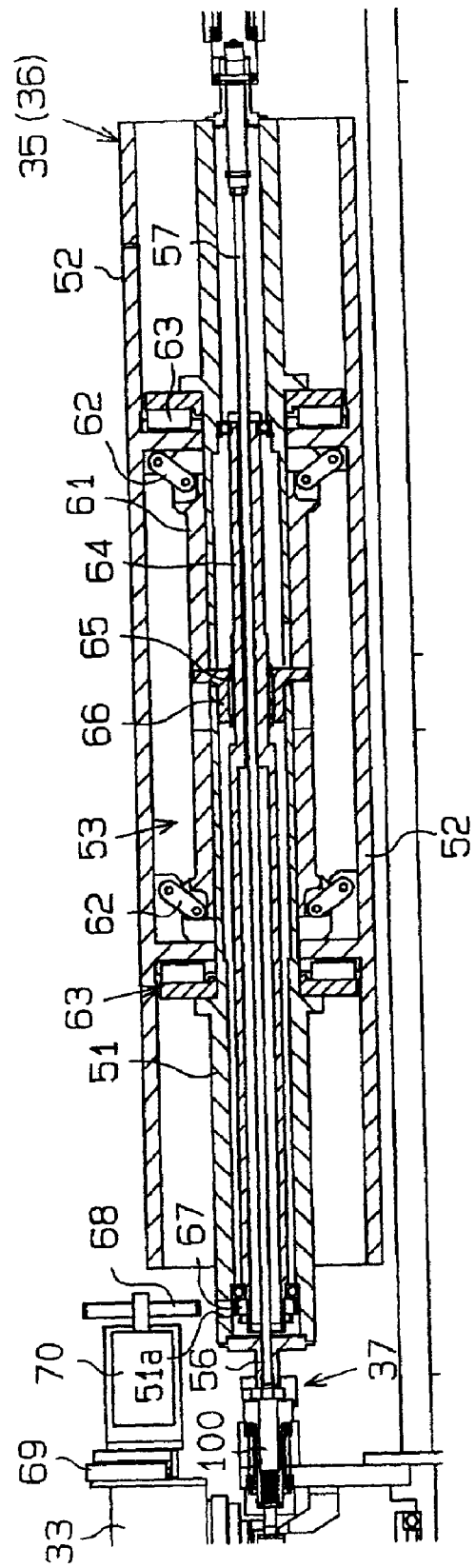
FIG. 6 is an enlarged vertical sectional view illustrating a drum.
Figure 7:
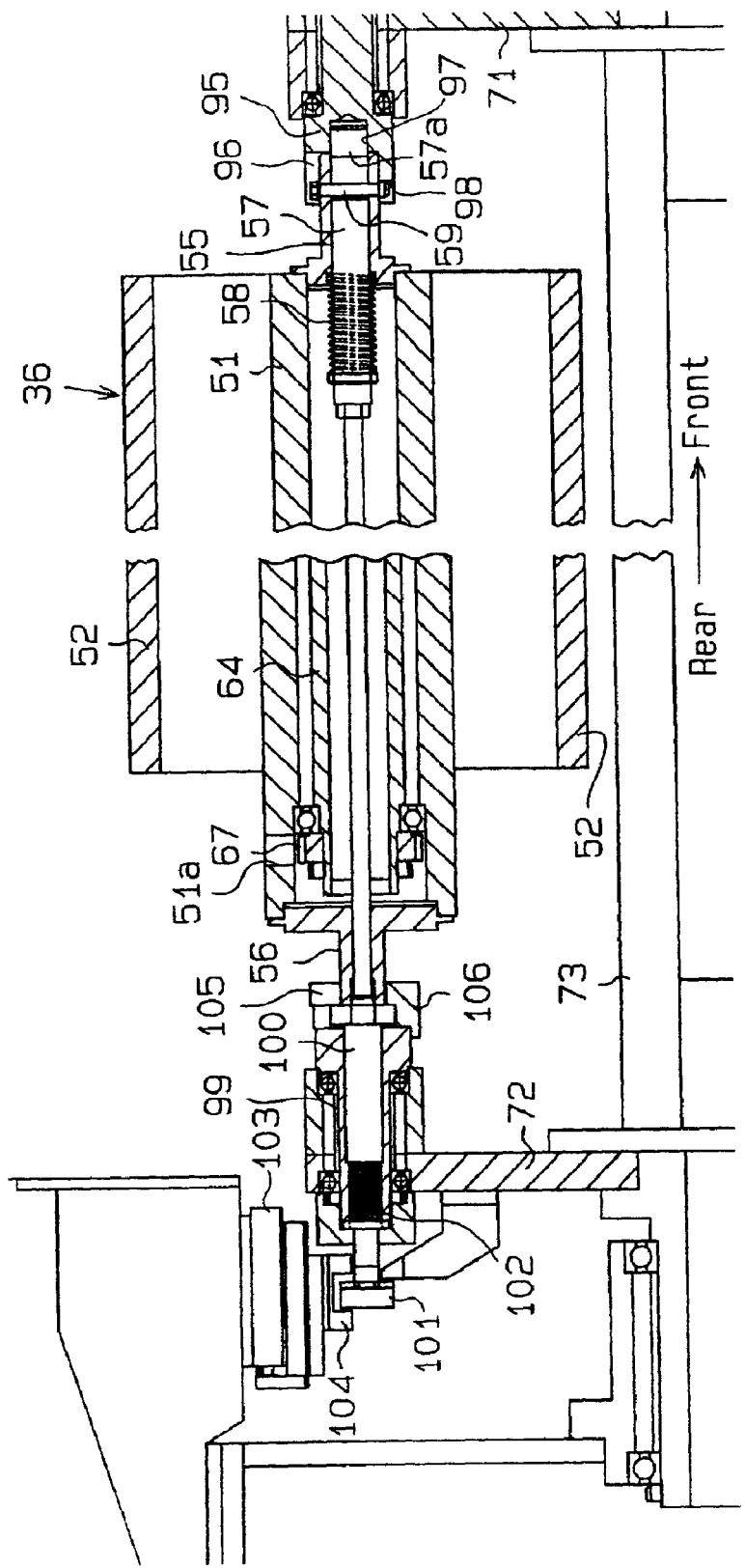
FIG. 7 is an enlarged sectional view illustrating a drum clamp mechanism.

First, the structure of the drums will be described in detail. As illustrated in FIGS. 3, 6 and 7, a pair of drums 35, 36 are formed in the shape of cylinder, and constructed to have variable diameters such that the diameters of their outer peripheral surfaces, on which a ribbon is wound, can be changed. Since both drums are constructed substantially in a similar manner, one drum 35 will be described.

The drum 35 is comprised of a laterally cylindrical drum shaft 51 positioned generally in a central portion and removably supported by the drum reversing/supporting mechanism 34; quarter arc drum pieces 52 divided into four and mounted on the outer side of the drum shaft 51; and a drum diameter changing mechanism 53 for moving each drum piece 52 in the radial direction to change the diameter.

Cylindrical shafts 55, 56 are protrusively formed at both front and rear ends of the drum shaft 51. As illustrated in FIG. 7, a knock shaft 57 is axially movably inserted into and supported by the center of the drum shaft 51, and urged by a spring 58 to move backward. A positioning pin 59 extends through and is supported by a front cylindrical shaft 55, and extends through an elongated hole 57*a* of the knock shaft 57.

The drum diameter changing mechanism 53 omits the uselessness of exchanging the entire drum each time the diameter of the drum is changed. A slide cylinder 61 is axially movably fitted on an intermediate outer peripheral surface of the drum shaft 51. This slide cylinder 61 and each of the drum pieces 52 are coupled by a link 62. The drum piece 52 is supported for movement only in the radial direction of the drum by each pair of front and rear thrust bearings 63 which are interposed between the drum piece 52 and the drum shaft 51. A ball screw shaft 64 is rotatably supported through a bearing to cover the knock shaft 57 inside the drum shaft 51, and a ball screw nut 65 is attached to the intermediate outer peripheral surface thereof. A portion of the nut block 66 integrated with the ball screw nut 65 extends through a hole through the drum shaft 51 into engagement with the slide cylinder 61.

A driven gear 67 is fitted in a rear end portion of the ball screw shaft 64. Corresponding to this driven gear 67, a driving gear 68 for driving the gear is mounted on the rear frame 33. A driving motor 70 is supported by the frame 33 through an elevating cylinder 69, and the driving gear 68 is mounded on its output shaft.

Therefore, as the driving motor 70 and driving gear 68 are moved down by the elevating cylinder 69 from the upper retreated position in FIG. 6, the driving gear 68 comes into mesh with the driven gear 67 through a hole 51*a* formed through the drum shaft 51. As the driving gear 68 is pivoted in this state, the ball screw shaft 64 is rotated to move the slide cylinder 61 forward or backward together with the nut block 66, and to move the drum pieces 52 outward or inward through the links 62 to enlarge or reduce the outer diameter of the drum 35.

The drum 35 is provided on the outer periphery with a start end holding mechanism, in this embodiment a vacuum hole, 35*a* for holding a distal end of the ribbon 39, and a start end holding mechanism, in this embodiment a vacuum hole, 35*b* for holding a wound ribbon, as illustrated in FIG. 12. A blade groove 35*c* is also formed in the outer periphery. The number into which the drum 35 is divided is preferably four or more.

The drum 35 is wound with the ribbon 39 with a spiral lead angle α. The blade groove 35*c* presents a gentle curve with a spiral lead angle β with respect to the axial line of the drum 35. The spiral lead angle β is set in the same manner as the spiral lead angle α, such that the cut edge of the ribbon 39 is at a right angle to the longitudinal direction of the ribbon 39. The spiral lead angles α, β are set, for example, in a range of 0.5 to 5.0 degrees.

Figure 4:
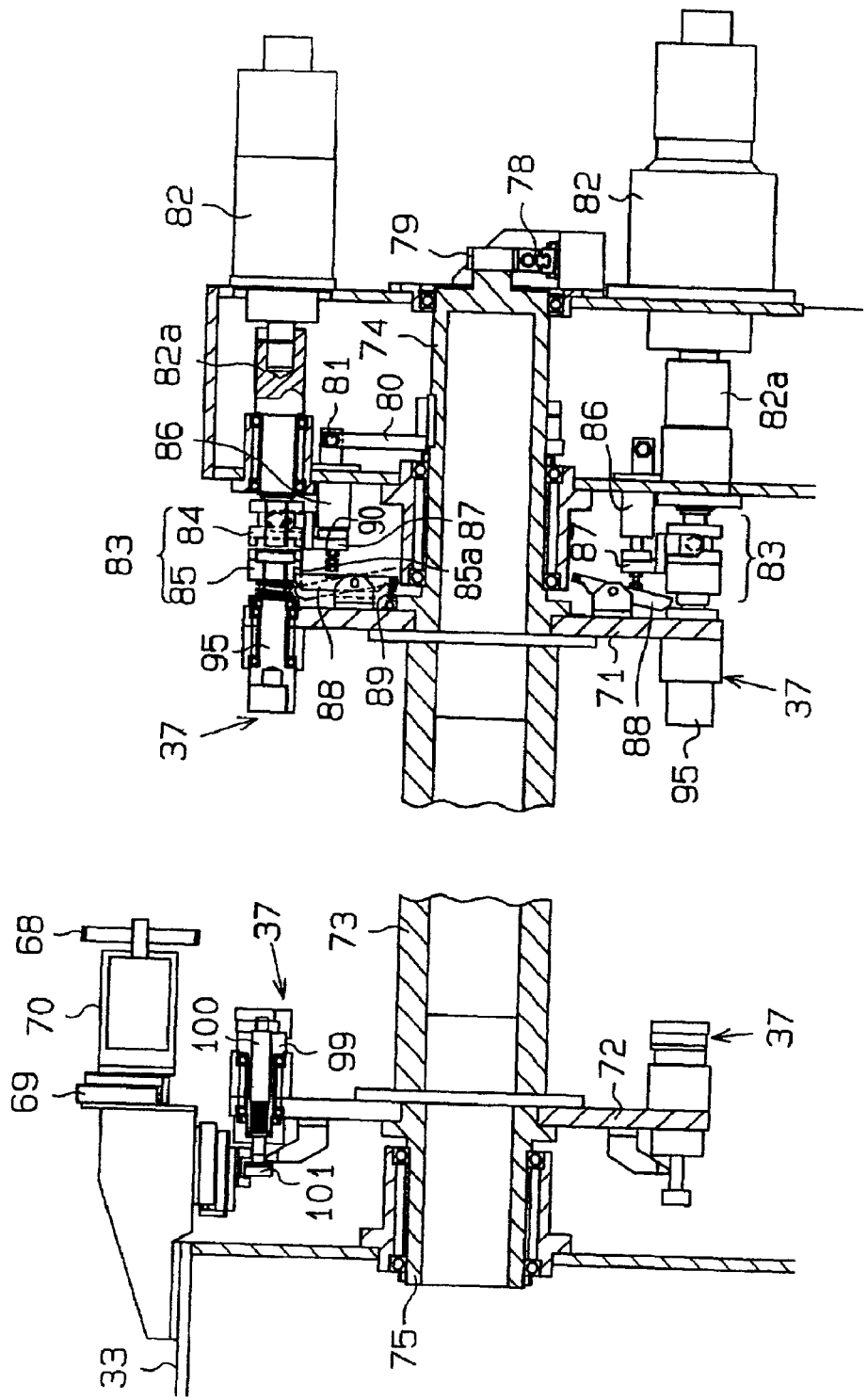
FIG. 4 is an enlarged side sectional view illustrating a main portion of a drum reversing/supporting mechanism.

Next, the drum reversing/supporting mechanism 34 will be described in detail. As illustrated in FIGS. 4 and 7, a pair of reverse support plates 71, 72 are rotatably supported between both frames 32, 33 through a reverse shaft 74 and a supporting shaft 75, as they are integrally coupled by a joint beam 73. Then, the pair of drum clamp mechanisms 37 for removably clamping the drums 35, 36 are disposed on the reverse support plates 71, 72 spaced by an angular distance of 180°. These drum clamp mechanisms 37 each comprise a holder shaft 95 disposed on the front reverse support plate 71, and a lock pin 100 disposed on the rear reverse support plate 72, as described later.

Figure 5:
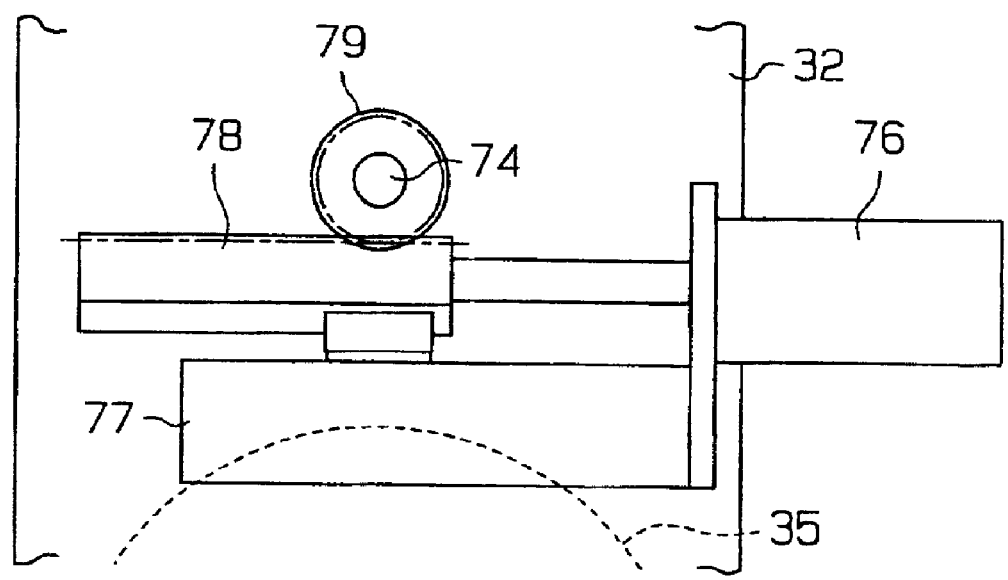
FIG. 5 is a front view of a driving portion of the drum reversing/supporting mechanism of FIG. 4.

The front frame 32 is provided with a reverse cylinder 76 through a bracket 77, as illustrated in FIG. 5. The reverse shaft 74 is reversely pivoted over 180 degrees through a rack 78 and a pinion 79 by appearing and disappearing actions of the reverse cylinder 76. Then, the pair of drums 35, 36 supported between both reverse supporting plates 71, 72 through the drum clamp mechanisms 37 are alternately placed between the upper position and lower position.

As illustrated in FIG. 4, a stopper arm 80 is provided protruding from the outer periphery of the reverse shaft 74, and the front frame 32 is provided with a pair of stopper bolts 81 to correspond to both sides of the stopper arm 80. Then, as the reverse shaft 74 is reversely pivoted, the stopper arm 80 comes in engagement with either one of the stopper bolts 81, so that the drums 35, 36 are positioned at the upper position or lower position.

As illustrated in FIG. 4, a pair of drum rotating motors 82 are disposed in the front frame 32 to correspond to the drums 35, 36 placed at the upper position and lower position. A clutch mechanism 83 is disposed between a motor shaft 82*a* of each motor 82 and a holder shaft 95 of each drum clamp mechanism 37. These clutch mechanisms 83 each include a first clutch tab 84 movably inserted into and supported by the motor shaft 82*a*, and a second clutch tab 85 fixed to the holder shaft 95. A pair of engagement/disengagement cylinder 86 are disposed in the front frame 32 to correspond to the first clutch tabs 84 of the respective drum clamp mechanisms 37. Then, the first clutch tabs 84 are brought into engagement with and disengaged from the second clutch tabs 85 through shifters 87 by appearing and disappearing actions of these engagement/disengagement cylinders 86.

A pair of lock arms 88 are pivotably supported by the front reverse support plate 71 to correspond to the second clutch tabs 85 of the respective drum clamp mechanisms 37. Then, when both clutch tabs 84, 85 of each drum clamp mechanism 37 are not in engagement, the lock arms 88 are urged by springs 89 for pivotal movements to positions at which they come in engagement with engaging recesses 85*a* of the second clutch tabs 85, as indicated by solid lines in FIG. 4, to restrain free rotations of the drums 35, 36. On the other hand, when both clutch tabs 84, 85 are in engagement by protruding actions of the engagement/disengagement cylinders 86, the lock arms 88 are moved away from the engaging recesses 85*a* of the second clutch tabs 85 through push bolts 90, as indicated by chain lines in FIG. 4, so that the drums 35, 36 are permitted to rotate.

As illustrated in FIG. 2, columns 133 are implanted on both front and rear sides of the base 31, and drums 35, 36 having different sizes for exchange are supported on the top of the columns 133.

(Drum Clamp Mechanism)

Next, the pair of drum clamp mechanisms 37 will be described in detail. As illustrated in FIGS. 4 and 7, a pair of holder shafts 95 are rotatably supported by the front reverse support plate 71 of the drum reversing/supporting mechanism 34, and an engaging recess 96, an engaging hole 97, and a positioning groove 98 are formed in an end portion thereof. Then, when the drums 35, 36 are mounted between both reverse support plates 71, 72 of the drum reversing/supporting mechanism 34, the cylindrical shaft 55, knock shaft 57 and positioning pin 59 of each drum 35, 36 are brought into engagement with the engaging recess 96, engaging hole 97, and positioning groove 98 of the holder shaft 95.

A pair of support cylinders 99 are rotatably supported by the rear reverse support plate 72 of the drum reversing/supporting mechanism 34 to correspond to the respective holder shafts 95. In each of the support cylinders 99, a lock pin 100 is axially movably supported, and an engaging ring 101 is attached to the rear end thereof. Then, as the lock pins 100 are urged by springs 102 to move in front, front ends of the lock pins 100 are inserted into and engaged with the rear cylindrical shafts 56 of the drums 35, 36. This causes the knock shafts 57 to move in front against the urging forces of the springs 58, so that the front ends of the knock shafts 57 are inserted into and engaged with the engaging holes 97 of the holder shafts 95.

Figure 8:
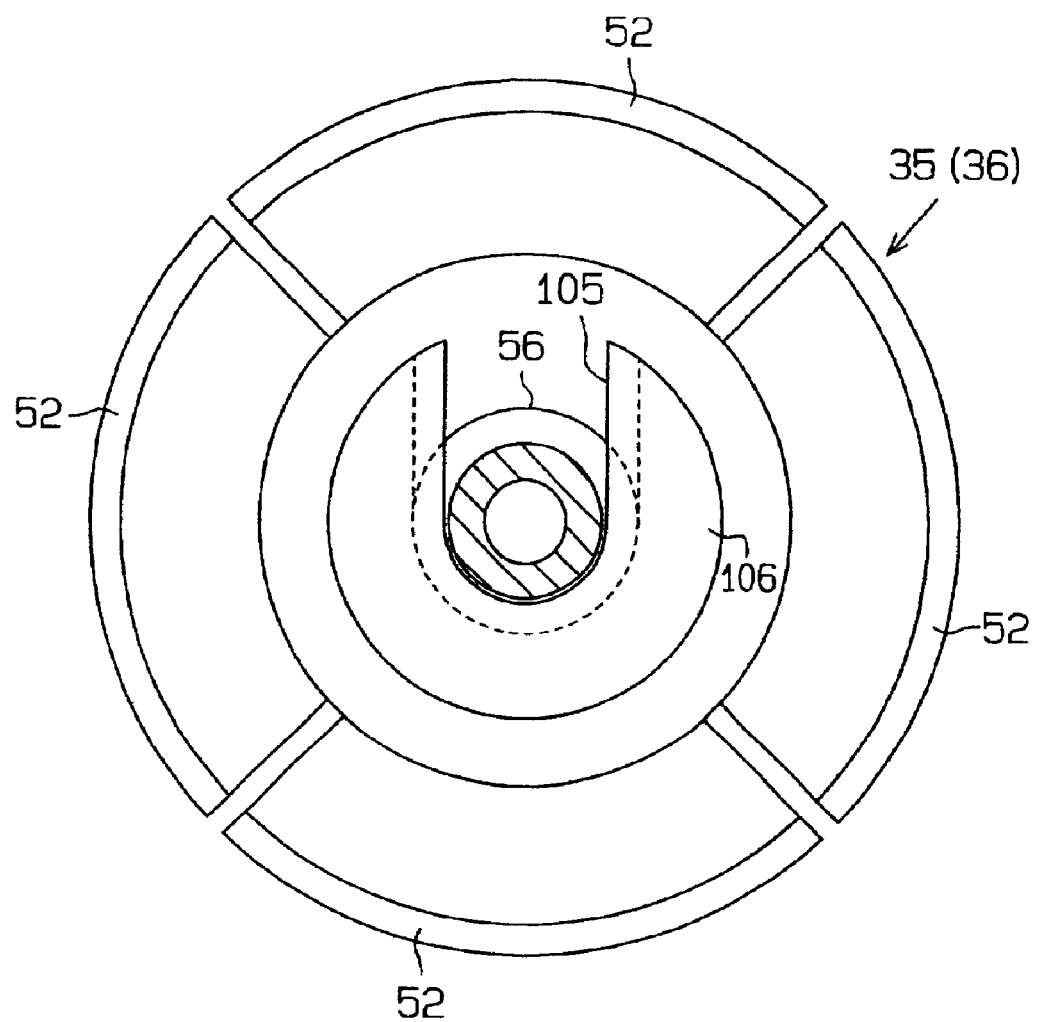
FIG. 8 is an enlarged front sectional view illustrating a drum supporting structure.

Above the rear frame 33, a drum releasing cylinder 103 is disposed, with its piston rod mounted with an actuation hook 104. A supporting member 106 having a recess 105 for engaging a distal end of the cylindrical shaft 56 is coupled to the front end of the supporting cylinder 99 as illustrated in FIG. 8, to align the cylindrical shaft 56 with the lock pin 100, stably support the cylindrical shaft 56, and facilitate removing and mounting operation therefor. Then, as the drum 35, 36 supported between both reverse support plates 71, 72 of the drum reversing/supporting mechanism 34 is reversely brought to the upper position, the engaging ring 101 on the lock pin 100 is correspondingly disposed to be engageable with the actuation hook 104. By protruding the drum releasing cylinder 103 in this state, the lock pin 100 is moved backward, and the drums 35, 36 are extracted from the rear cylinder shafts 56. Associated therewith, the knock shafts 57 within the drums 35, 36 are moved back by the urging forces of the springs 58, extracted from the engaging holes 97 of the holder shafts 95, thereby releasing the drums 35, 36 clamped by the drum clamp mechanism 37.

(Ribbon Winding Mechanism)

Figure 9:
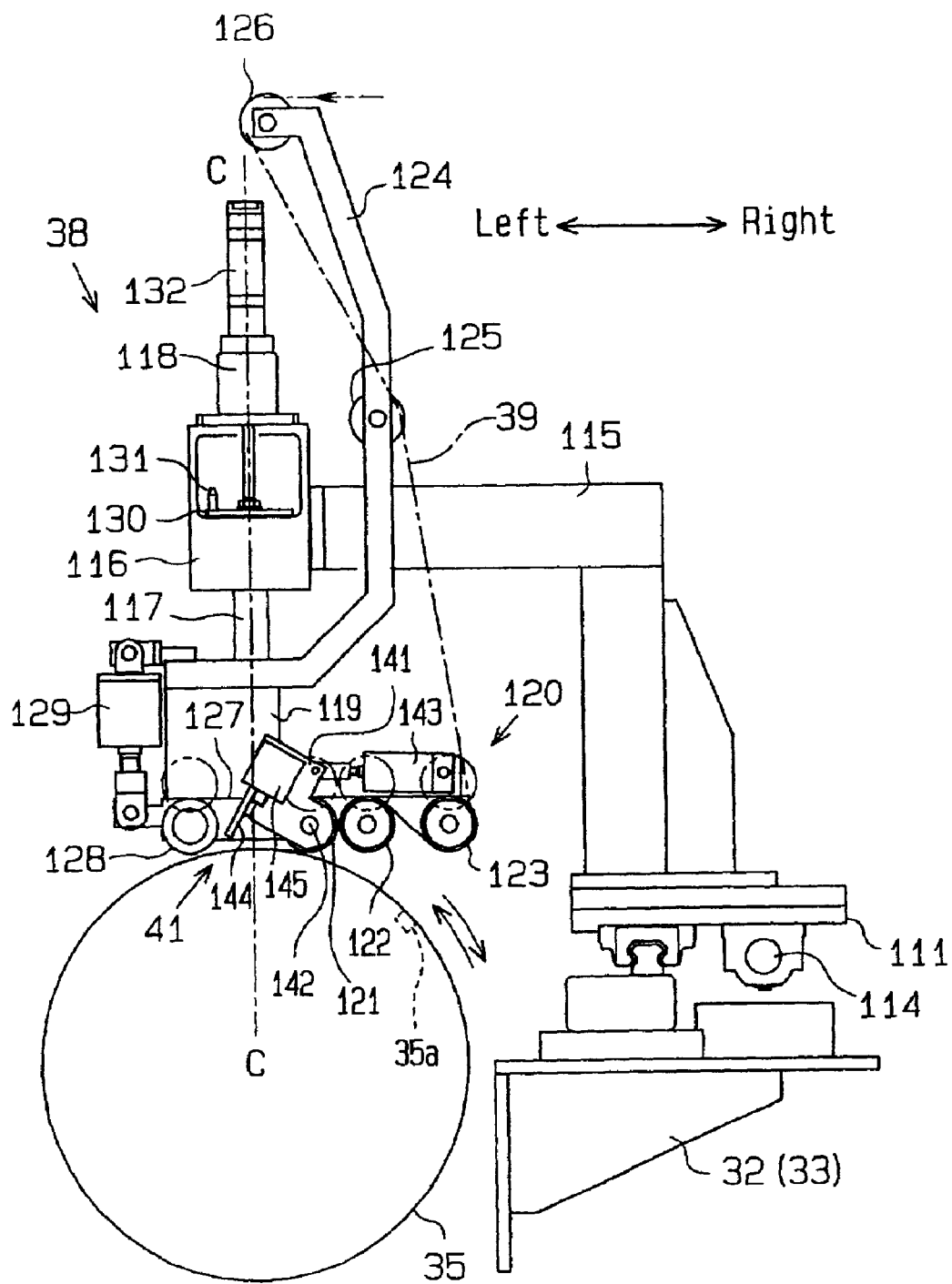
FIG. 9 is an enlarged front view illustrating a ribbon winding mechanism.
Figure 10:
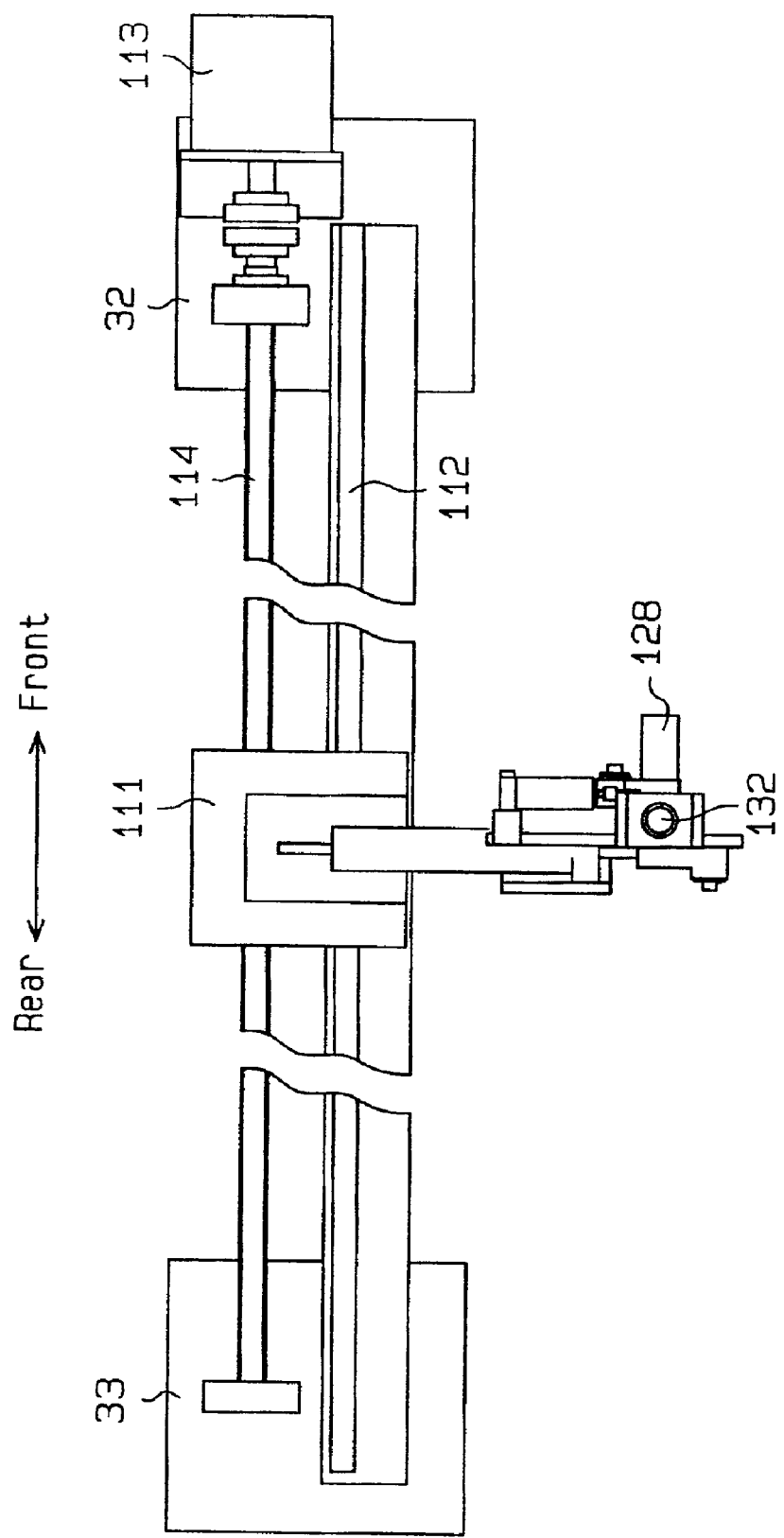
FIG. 10 is a plan view of the ribbon winding mechanism.

Next, the ribbon winding mechanism 38 will be described in detail. As illustrated in FIGS. 9 and 10, a moving stand 111 is supported between both frames 32, 33 for movement in the front-to-rear direction through a guide rail 112, so that the moving stand 111 is moved by a feed moving motor 113 through a feed screw 114. On the moving stand 111, an attachment arm 115 is supported to face to the left in FIG. 9, and an attachment base 116 is fixed at a distal end of the attachment arm 115.

A swing shaft 117 is supported in the vertical direction on the attachment base 116 to swing about the vertical axis by a swing cylinder 118. A ribbon winding guide 120 is attached to a lower end of the swing shaft 117 through a bracket 119. This ribbon winding guide 120 comprises one grabbing roller 121, 122 for grabbing a distal end of the ribbon 39, and a guide roller 123. Each of the rollers 121 to 123 guides the ribbon 39 when the distal end of the ribbon 39 fed from a ribbon manufacturing device, not shown, is spirally wound on the peripheral surface of the drum 35. The bracket 119 has rollers 125, 126 for guiding the ribbon 39 through an arm 124.

The bracket 119 is provided with a bonding mechanism for pressing the side edges of the wound ribbon 39 to each other for bonding, when the ribbon 39 is spirally wound on the outer peripheral surface of the drum 35. This bonding mechanism is comprised of a tilt lever 127 pivotably supported by the bracket 119; a presser roller 128 having its axis supported by a distal end of the tilt lever 127; and a cylinder 129 for tilting the tilt lever 127 up and down. A positioning plate 130 and a stopper 131 are provided between the attachment base 116 and swing shaft 117 for restricting a swingable range of the swing shaft 117, and a swingable angle of the ribbon winding guide 120 is set to 180 degrees.

An elevating cylinder 132 is provided above the attachment base 116 for moving the swing shaft 117 up and down. Then, the ribbon winding guide 120 is switched to a preparatory position at which the ribbon winding guide 120 approaches the drum 35 by the appearing and disappearing actions of the elevating cylinder 132; an active position at which a winding operation is performed; and a retreating position spaced upward.

Therefore, as the swing shaft 117 is moved down, the distal end of the ribbon 39 grabbed by the rollers 121, 122 is led until it comes in contact with the outer periphery of the drum 35, 36, with the winding guide 120 being arranged at the lower preparatory position corresponding to the drum 35, 36 (see the positions of the rollers indicated by chain lines in FIG. 9). In this state, the drum 35 is reversed in the counter-clockwise direction in FIG. 9, the distal end of the suspended ribbon 39 advances in a gap between the drum 35 and the grabbing roller 121, and the leading end holding vacuum hole 35a is moved to a position substantially corresponding to the grabbing roller 121, so that a winding start end of the ribbon 39 is adsorbed and held by the leading end holding vacuum hole 35a. Subsequently, the ribbon winding guide 120 is moved down from the preparatory position and switched to the active position, causing the roller 121 to approach the drum 35. In this state, the drum 35 is forwardly rotated in the clockwise direction in FIG. 9, the ribbon 39 is pressed onto the outer periphery of the drum 35, 36 by the presser roller 128 of the winding guide 120, and the supply of the ribbon 39 is guided by the respective rollers 121, 122, 123. In synchronism with the start of winding, the winding guide 120 is linearly moved in a direction parallel with the axial direction of the drum 35 by a feed moving motor 113, thereby spirally winding the ribbon 39 on the outer periphery of the drum 35. Then, both lateral edges of the ribbon 39 are bonded to each other to form a wrapper 40.

In this embodiment, as illustrated in FIG. 12(a), one of the drums 35 is rotated in the counter-clockwise direction, viewed from the front, and the ribbon 39 is wound from the outer peripheral surface near the front end toward the rear. After this operation is terminated, the ribbon winding guide 120 is moved upward by the elevating cylinder 132, and swung by 180 degrees by the swing cylinder 118. Then, with the other drum 36, placed at the lower position, reversed to the upper position, the ribbon winding guide 120 is moved down to the active position. Subsequently, the drum 36 is rotated in the clockwise direction, viewed from the front, and the ribbon 39 is wound from the outer peripheral surface near the rear end toward the front.

Figure 14:
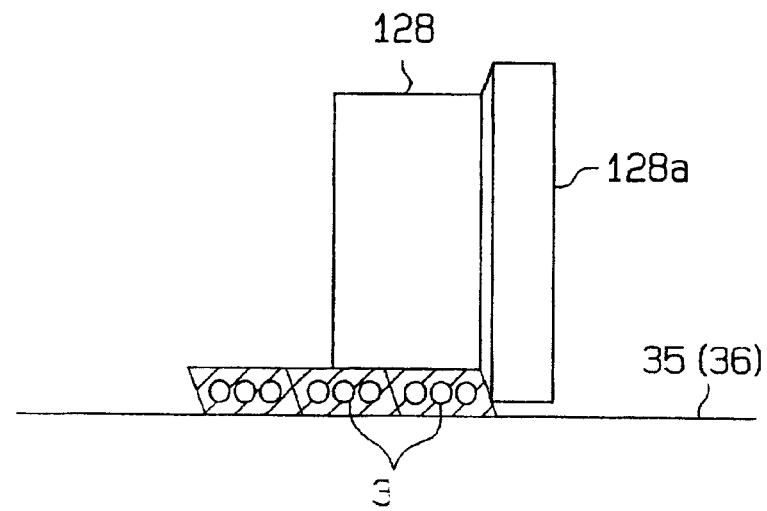
FIG. 14 is a front view of a presser roller.

The presser roller 128 presses the ribbon 39 to straddle an adjacent ribbon, as illustrated in FIG. 14, and lateral edges of the wound ribbon is bonded to each other. In this event, since the cross section of the ribbon 39 is in the shape of parallelogram as illustrated in FIG. 11, the bonding is ensured. Since a guide 128a of the presser roller 128 has a diameter to form a slight gap between itself and the drum 35, it prevents the adjacently wound ribbon 39 from laterally displacing to increase a bonding strength.

(Ribbon Cutting Mechanism)

Next, the ribbon cutting mechanism 41 will be described. As illustrated in FIG. 9, the ribbon cutting mechanism 41 in this embodiment is disposed on the bracket 119 of the ribbon winding mechanism 38. A holder 141 is supported on the bracket 119 for pivotal movement by a shaft 142 so that the holder 141 is tilted by a cylinder 143. A cutter 144 is supported on the holder 141 for reciprocal movement by a cylinder 145.

Therefore, as the cylinder 145 is actuated at a winding finish end of the ribbon 39 to press the cutter 144 onto the peripheral surface of the drum 35, the winding finish end of the ribbon 39 can be cut at a right angle to the longitudinal direction thereof.

(Wrapper Cutting Mechanism)

Figure 15:
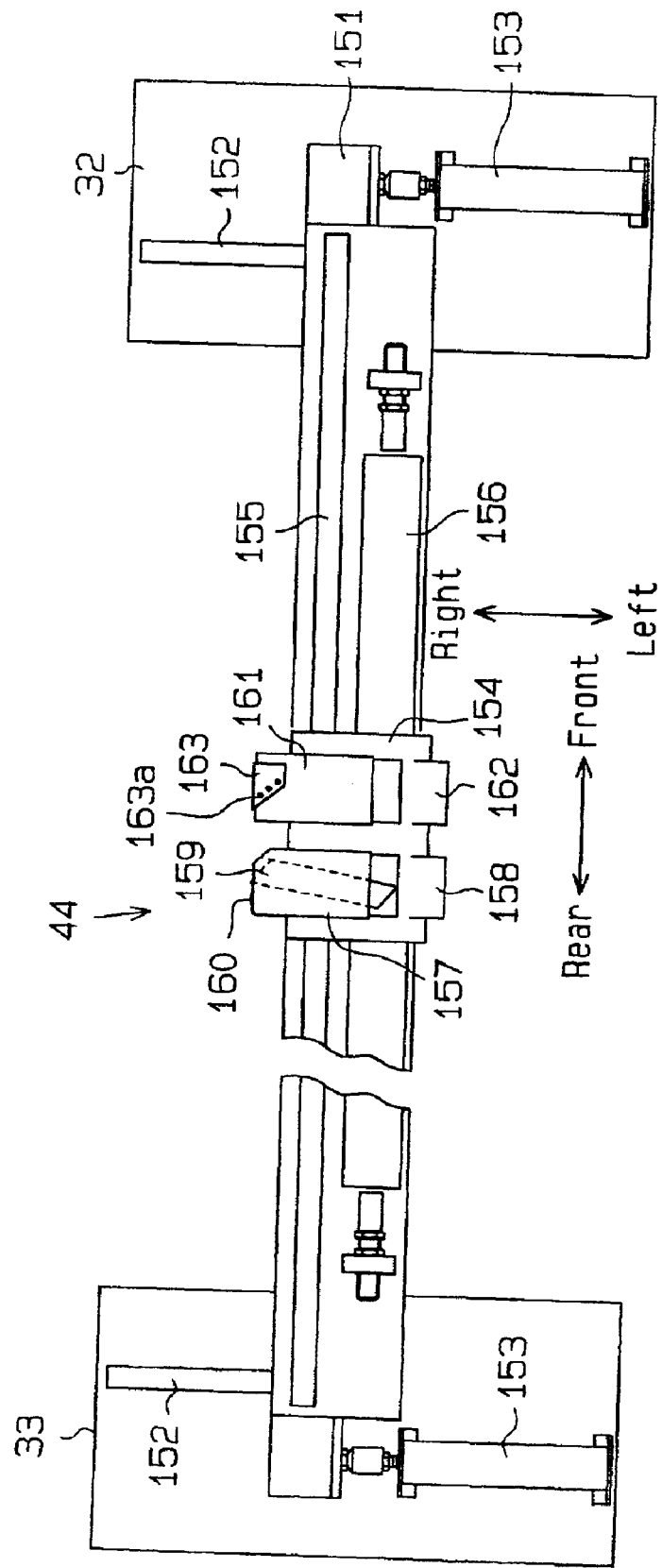
FIG. 15 is a plan view of a wrapper cutting mechanism.
Figure 16:
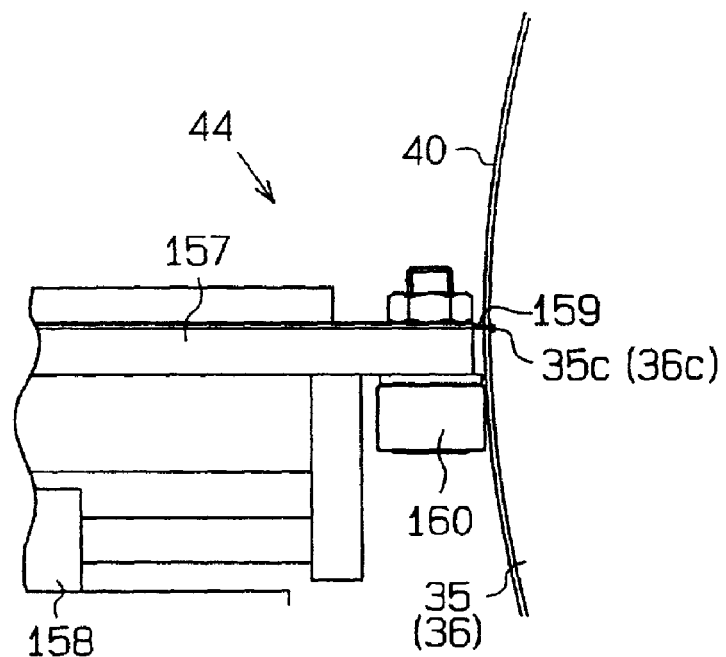
FIG. 16 is a side view of a main portion of the wrapper cutting mechanism.
Figure 17:
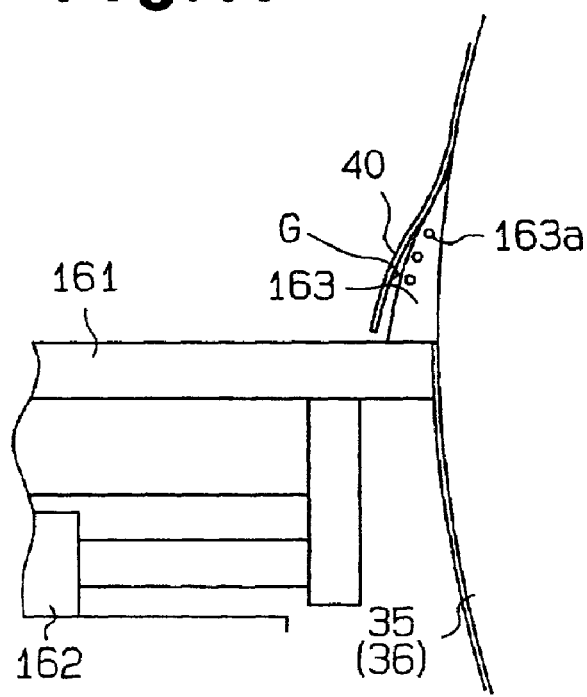
FIG. 17 is a side view of a scraper.

Next, the wrapper cutting mechanism 44 will be described in detail. As illustrated in FIGS. 2 and 15, a base frame 151 is supported between both frames 32, 33 through a guide rail 152 for movement in the right-to-left direction to correspond to the drum 35 reversed to and supported at the lower position, so that the base frame 151 is moved by a feed moving cylinder 153. A front-to-back moving body 154 is supported on the base frame 151 through a guide rail 155 for movement in the front-to-back direction, so that the front-to-back moving body 154 is moved by a feed moving cylinder 156. A movable supporting base 157 is supported on the front-to-back moving body 154 for movement in the right-to-left direction by a moving cylinder 158 through a guiding mechanism, not shown. A cutter 159 and a presser roller 160 are supported on the movable supporting base 157. Then, the cutter 159 is moved by the moving cylinder 158 to a right-hand active position at which the cutter 159 approaches the drum 35, 36; and a left-hand inactive position at which the cutter 159 is moved away from the drum 35, 36. Similarly, a movable supporting base 161 is supported on the front-to-back moving body 154 for movement in the right-to-left direction by a moving cylinder 162 through a guiding mechanism, not shown. A scraper 163 is supported on the movable supporting base 161 as a peeling tool for partially peeling an edge of the cut wrapper 40 from the drum 35. As illustrated in FIG. 16, the presser roller 160 is positioned below a cutting line by the cutter 159, and as illustrated in FIG. 17, the scraper 163 is positioned above the cutting line. The scraper 163 is provided with a spray hole 163*a* for spraying compressed air toward a back surface of the cut edge.

Therefore, as illustrated in FIG. 16, the movable supporting base 157 is moved toward the drum 35 by the moving cylinder 158 to drive the cutter 159 into the front edge of the wrapper 40 and to press the presser roller 160 onto the wrapper 40 below the cutter 159. As the feed moving cylinder 156 is actuated in this state, the front-to-back moving body 154 is moved from the front to the rear along the guide rail 155, so that the wrapper 40 is cut by the cutter 159, subsequent to the presser roller 160 which is slightly in advance. This cutting operation is followed by the scraper 163 which slips into the upper side end of the cut wrapper 40 to partially peel the cut edge of the wrapper 40 from the back surface of the drum 35 in cooperation with a compressed air spraying action from the spray hole 163*a* to form a wedge-shaped gap G.

The foregoing cutting and peeling operations for the wrapper 40 are also performed on the opposite side of the wrapper 40, by rotating the drum 35 by 180 degrees, resulting in the production of a total of two body ply materials 46A, 46B having the same width W dimension on the surface of the drum 35. The scraper 163 is not used in the second cutting operation.

(Body Ply Material Peeling Mechanism)

Figure 18:
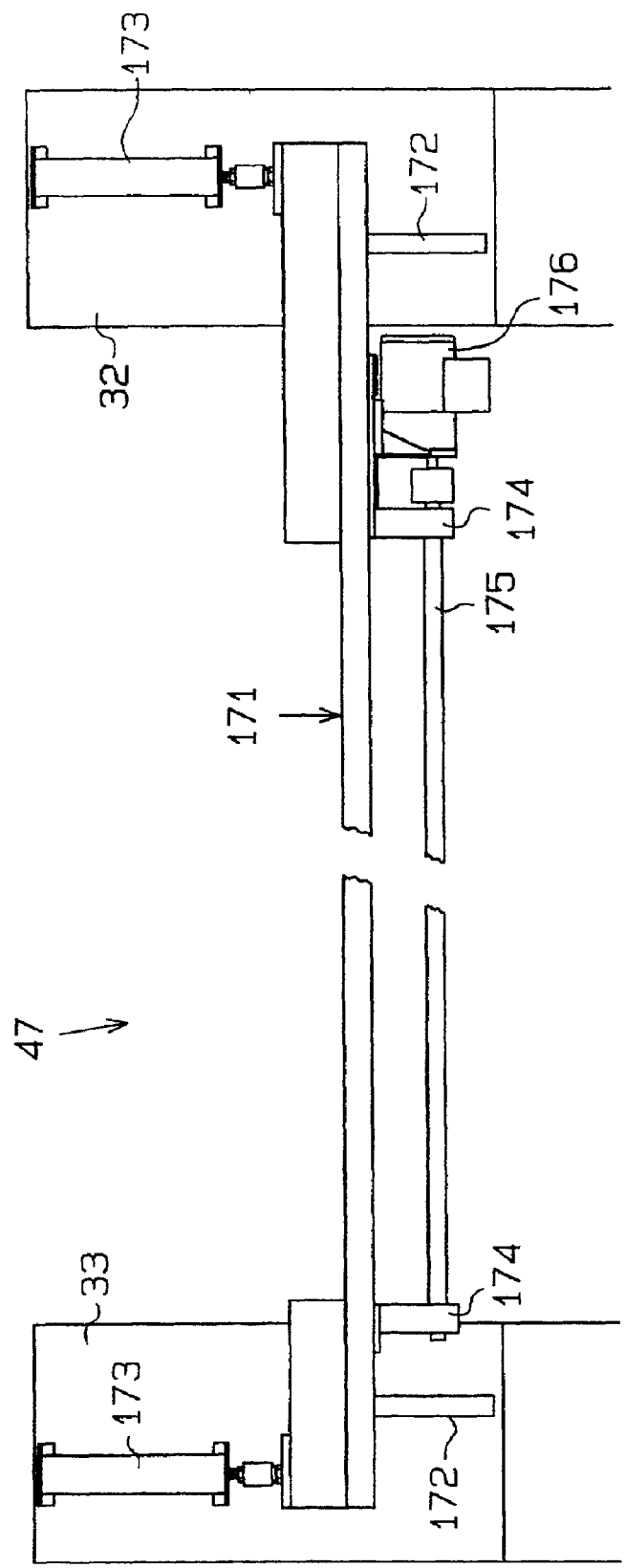
FIG. 18 is a plan view of a body ply material peeling mechanism.
Figure 19:
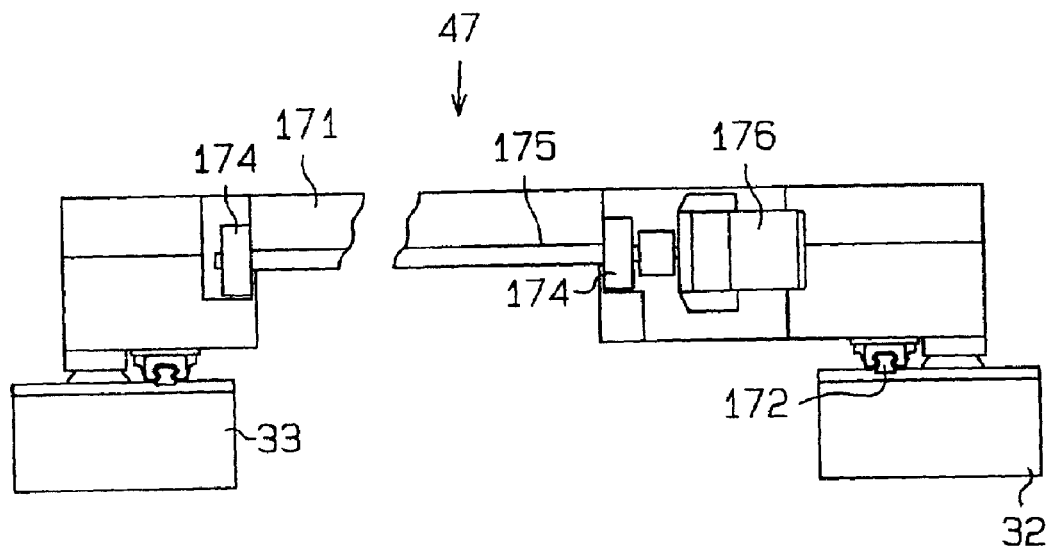
FIG. 19 is a front view of the body ply material peeling mechanism.

Next, the body ply material peeling mechanism 47 will be described in detail. As illustrated in FIGS. 18 to 20, an attachment beam 171 is supported between both frames 32, 33 through a guide rail 172 for movement in the right-to-left direction, so that the attachment beam 171 is moved by a pair of moving cylinders 173 between a right-hand retreating position, and an active position proximate to the drum 35. A rotating peeling bar 175 is rotatably supported on the bottom surface of the attachment beam 171 through a pair of front and rear bearings 174. On the bottom surface of the attachment beam 171, a motor 176 is mounted for rotating the rotating peeling bar 175.

Thus, as the wrapper 40 is cut as illustrated in FIG. 20, the rotating peeling bar 175 is moved by the action of the moving cylinder 173 from the retreating position indicated by chain lines to the active position indicated by solid lines. The rotating peeling bar 175 is introduced into the wedge-shaped gap G between the drum 35 and the cut edge of the body ply material 46B. In this state, a tray 50, later described, is moved from the lower retreating position indicated by the chain lines to the upper active position indicated by solid lines and brought into contact with the body ply material 46B, and the peeled edge of the boy ply material 46B is adsorbed on the top surface of the tray 50 by a vacuum pad 190. Next, as the tray 50 is moved to the right while the drums 35, 36 and rotating peeling bar 175 are being rotated respectively in the counter-clockwise direction, the body ply material 46B is peeled from the outer peripheral surface of the drum 35 by the rotating peeling bar 175, and pressed and transferred on the top surface of the tray 50.

(Tray Transporting Mechanism)

Next, the tray transporting mechanism 48 will be described in detail. As illustrated in FIGS. 1 to 3 and 21, 22, the moving table 49 is supported on the base 31 through a pair of guide rails 181 for movement in the right-to-left direction, so that the moving table 49 is moved by a feed moving motor 182 through a feed screw 183. An elevating support plate 184 is supported on the moving table 49 for up and down movements through a plurality of elevating cylinders 185 and knuckle joints 186, and the tray 50 is disposed on the top surface of the moving table 49.

Then, the elevating support plate 184 is moved up by an elevating cylinder 185 so that the tray 50 carried on the top surface is pressed onto the outer peripheral surface of the drum 35, 36. In this event, tilting of the elevating support plate 184 is permitted between a portion of the elevating support plate 184 corresponding to the drum 35, 36 and a portion of the same not corresponding to them. By moving the moving table 49 in the left direction, passing through the under side of the drum 35, 36 in this state, the body ply materials 46A, 46B peeled from the drum 35, 36 are extended on and transferred to the tray 50.

A plurality of stopper rollers 187 are rotatably disposed on the elevating support plate 184 to engage with one side and one edge of the tray 50. A plurality of clamp cylinders 188 are disposed on the elevating support plate 184 to correspond to the respective stopper rollers 187, and clamp rollers 189 are attached to these piston rods. Then, a protruding operation of each clamp cylinder 188 causes the clamp roller 189 to be pressed to and engaged with the other side and the other edge of the tray 50, so that the tray 50 is clamped to a predetermined position on the elevating support plate 184. The tray 50 is provided with vacuum pads 190 at a plurality of locations, such that the peeled body ply material 46A is adsorbed on the vacuum pads 190.

Figure 21:
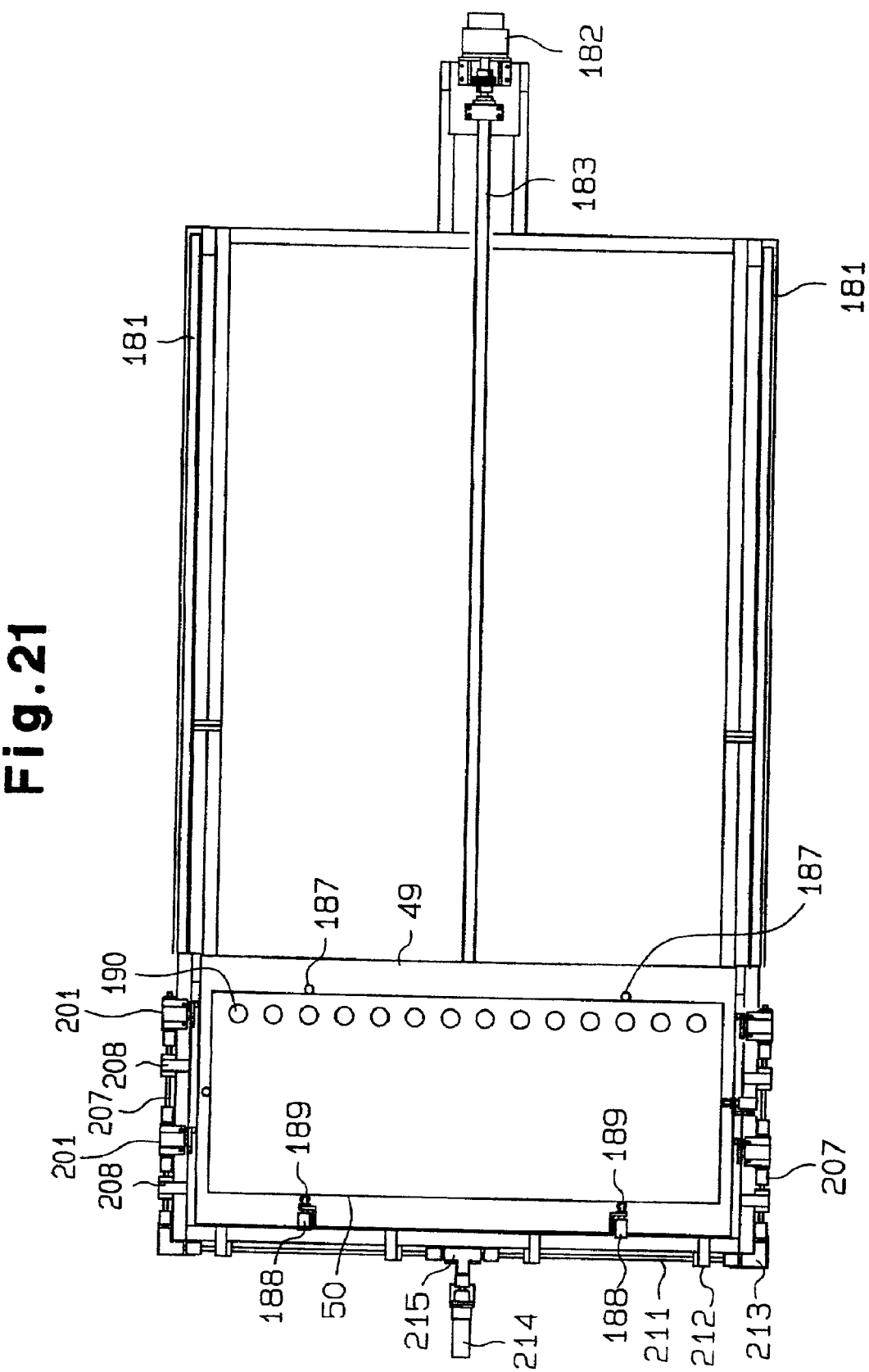
FIG. 21 is a plan view illustrating a tray transporting mechanism.
Figure 22:
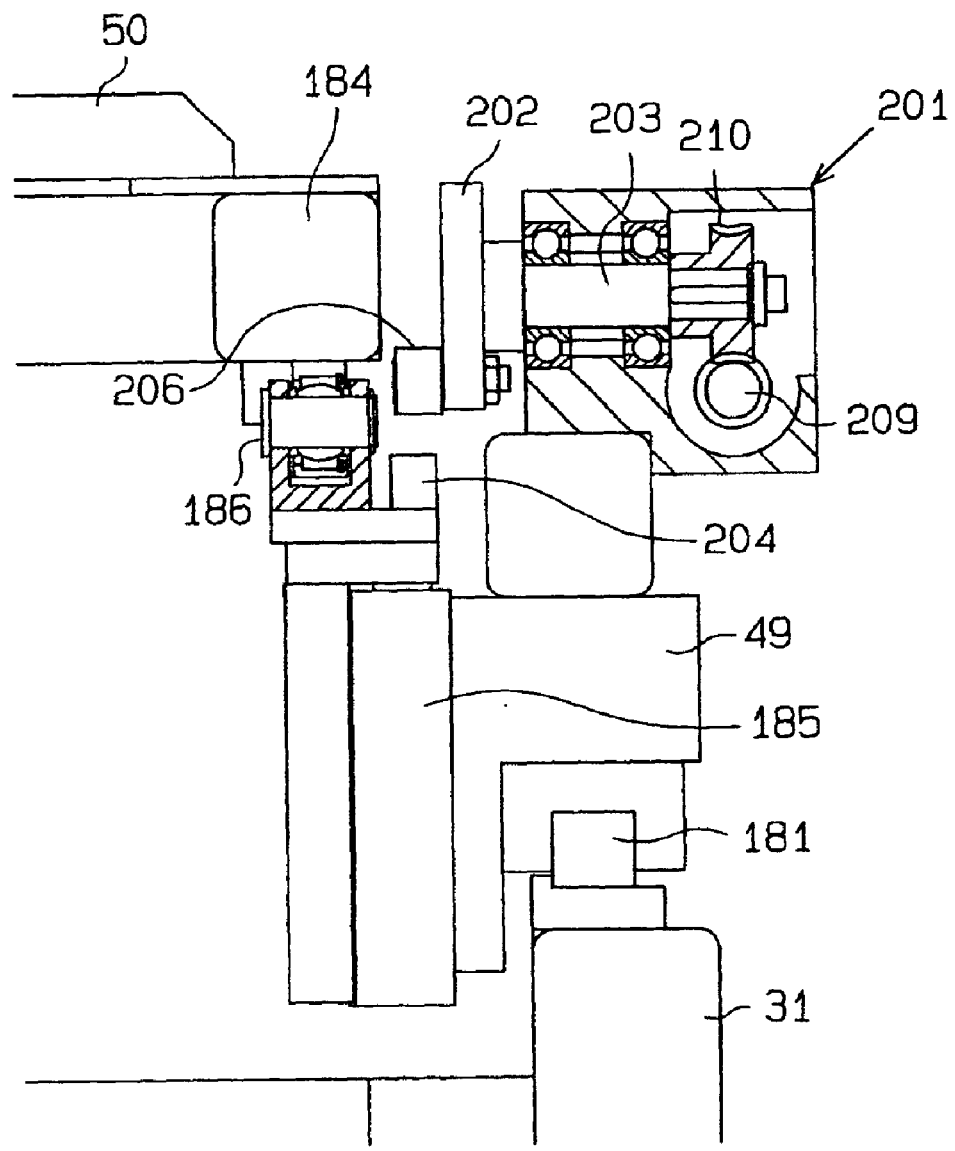
FIG. 22 is an enlarged sectional view near an elevating cylinder of the tray transporting mechanism.

A plurality of gear cases 201 are disposed at predetermined intervals on front and rear edges on a right-hand top surface of the moving table 49. As illustrated in FIG. 22, an adjusting plate 202 is rotatably supported by each gear case 201 through a rotating shaft 203, and an engaging roller 236 is rotatably supported on the surface of the gear case for engagement with a stopper 204 on a knuckle joint 186. As illustrated in FIG. 21, a pair of adjusting shafts 207 are rotatably supported on the moving table 49 through a plurality of bearing blocks 208. Portions of both adjusting shafts 207 corresponding to each gear case 201 are formed with worms 209, as illustrated in FIG. 22, which are in mesh with a worm wheel 210 on the rotating shaft 203.

A pair of driving shafts 211 are rotatably supported on the moving table 49 through a plurality of bearing blocks 212 to extend along the left-side edge of the moving table 49, and their outer ends are operatively coupled to both adjusting shafts 207 through a bevel gear mechanism 213. On a left side surface of the moving table 49, an adjusting motor 214 is disposed, with its motor shaft being operatively coupled to inner ends of both driving shafts 211 through a bevel gear mechanism 215. Then, when the outer diameter dimensions of the drums 35, 36 are changed, or when the drums 35, 36 are exchanged by those having different outer diameters, each adjusting plate 202 is rotated by the adjusting motor 214 through the driving shaft 211, adjusting shaft 207, worm 209, worm wheel 210 and rotating shaft 203 to change a height position of the engaging roller 206. This results in a change in an upper position of an elevating support plate 18 by the elevating cylinder 185, so that the tray 50 is properly brought into contact with the body ply materials 46A, 46B which are wound on the drums 35, 36.

The foregoing mechanism constitutes a pressing force adjusting mechanism for adjusting a pressing force of the tray 50 to the drums 35, 36.

(Operation of Whole Manufacturing Device)

Next, the operation of the device for producing a body ply material for a tire, constructed as described above, will be described.

Figure 12B:
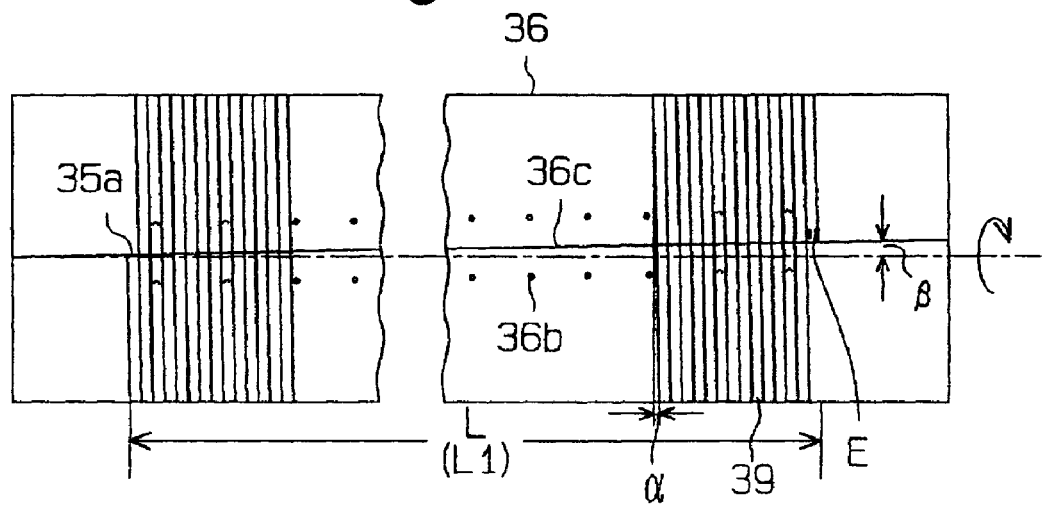

In this producing device, the pair of drums 35, 36, supported by the drum reversing/supporting mechanism 34, are alternately reversed to the upper position and lower position. Then, the outer periphery of one of the drums 35, 36 placed at the upper position is spirally wound with the ribbon 39 by the ribbon winding mechanism 38 to form the wrapper 40. In this event, as to the first drum 35, as illustrated in FIG. 12(a), the first drum 35 is rotated in the counter-clockwise direction, while the winding guide 120 is moved backward to wind the ribbon 39. On the other hand, as to the second drum 36, as illustrated in FIG. 12(b), the second drum 36 is rotated in the clockwise direction, while the winding guide 120 is moved in front to wind the ribbon 39.

Simultaneously with the winding of the ribbon 39 and the like on the drum 36 at the upper position, the wrapper 40 on the other drum 35 placed at the lower position is cut along one blade groove 35c by the wrapper cutting mechanism 44, as illustrated in FIGS. 13 and 23(a). In this event, as illustrated in FIG. 17, the edge of the wrapper 40 is peeled in cooperation of the scraper 163 with air sprayed from the spray hole 163a to form the gap G.

Next, the drum 35 is rotated by 180 degrees by the action of the drum rotating motor 82, and the cutter 159 is pressed onto the other blade groove 35c, to perform the second cutting of the wrapper 40, as illustrated in FIG. 23(b). By this operation, the body ply materials 46A, 46B having a predetermined width W are formed on the drum 35. In the second cutting operation, the edge of the body ply material 46A is not peeled by the scraper 163.

Then, the cut and formed body ply materials 46A, 46B are pivoted substantially by 45 degrees in the clockwise direction together with the drum 35, as illustrated in FIG. 23(c), and moved to a peeling/transfer position. Since the operation for peeling and transferring the body ply material 46A in this state has been described in detail in connection with FIG. 20, description is omitted.

As the body ply material 46A has been transferred, the body ply material 46A remains on the peripheral surface of the drum 35 as illustrated in FIG. 23(d), so that an operation for peeling the remaining body ply material is performed. Specifically, as illustrated in FIG. 23(e), the drum 35 is pivoted in the counter-clockwise direction with the rotating peeling bar 174 being pressed onto the peripheral surface of the drum 35, and the tray 50 is moved to the right. Thus, the body ply material 46A is forcedly peeled from the drum 35, and transferred onto the top surface of the tray 50. While the operation for peeling and transferring the body ply material 46B is similar to the operation for peeling and transferring the body ply material 46A, a difference lies in that the gap G is not formed so that the rotating peeling bar 175 is brought into contact with the edge of the body ply material 46A to forcedly peel the body ply material 46A.

As the two body ply materials 46A, 46B have been transferred in the foregoing manner, the drum 35 is emptied as illustrated in FIG. 23(f).

In the foregoing manner, while a pair of drums 35, 36 are alternately reversed to the upper position and lower position by the drum reversing/supporting mechanism 34, the operation for winding the ribbon 39 on the drum 35, 36 at the upper position, and the operation for cutting the wrapper 40 on the drum 36, 35 at the lower position are performed in repetition. By this operation, the body ply materials 46A, 46B of a width W and a length L, having the linear cords 39a arranged in one direction, are alternately formed in continuation.

The body ply material 46A (46B) is embedded in a tire 252 in a ring shape as indicated by solid lines in FIG. 24 to form a body ply. For forming a two-layer structure as indicated by chain lines in the same figure, it is necessary to make the length of an extension in the width direction of both lateral edges of the body ply material 46B larger by a distance h than the body ply material 46A in order to limit a locally concentrated stress. For forming the two types of body ply materials 46A, 46B having different widths W, the following two methods can be given, for example. In a method of producing a single body ply material by cutting a wrapper on one drum at one location in the longitudinal direction of the drum, the wrappers on a plurality of drums having different peripheral lengths M are cut at one location in the longitudinal direction of the drum, respectively, to produce two body ply materials having different width dimensions for use in one tire. On the other hand, in a method of producing two body ply materials for use in one tire by cutting the wrapper on a single drum at two locations in the longitudinal direction of the drum, the wrapper is cut at two locations such that the two body ply materials have different width W dimensions from each other.

(Effects of Embodiment)

Effects expected by the foregoing embodiment will be described below.

(1) The peripheral length M dimension of the outer peripheral surface of the drum 35, 36 is set to the same as or integral multiples of the width W dimension of the body ply materials 46A, 46B for use in a tire, and the winding length L of the wrapper 40 in the longitudinal direction of the drum is set equal to a length dimension L1 of the body ply materials 46A, 46B for use in a tire.

Thus, the diameter dimension and length dimension of the drum can be reduced to downsize the device for producing a body ply material, thereby reducing a space for installation thereof. Also, the body ply materials 46A, 46B can be formed on the same drum by cutting the wrapper 40, thereby making it possible to eliminate a stock of sheets having a large area as intermediates of body ply materials.

The ring-shaped body ply material 46A provided in the aforementioned embodiment has the linear cords 39a oriented in the width direction, and the linear cords 39a are arranged at a uniform pitch over the entire periphery, thereby making it possible to ensure a stable quality.

(2) Since the ribbon winding mechanism 38 performs a winding operation on the drum in a direction parallel with the axial direction thereof in an ongoing stroke and a returning stroke, the work efficiency can be improved.

(3) Since the length L of the body ply materials 46A, 46B is set equal to the length L1 used in one tire, cutting into a proper dimension can be eliminated in a later process.

(4) The ribbon winding guide 120 is moved in the axial direction of the drum at a predetermined feeding speed relative to the drums 35, 36 rotatably supported by the frames 32, 33. Thus, the ribbon can be smoothly wound on the drum.

(5) Since the bonding mechanism is configured to bond the lateral edges of the ribbon with a pressure by the presser roller 128, following a ribbon winding operation of the ribbon winding mechanism 38, the lateral edges of the ribbon can be readily bonded to each other exactly.

(6) Since the drums 35, 36 are provided with the distal end holding vacuum holes 35a, 36a capable of holding a winding start end of the ribbon, the ribbon winding operation can be rapidly performed exactly.

(7) Since the frame 32 is provided with the cutter 144 for cutting a finish end of the ribbon wound on the drum, the ribbon can be readily cut without fail.

(8) The cutter 159 provided for movements into contact with and away from the drum 35, 36, corresponding thereto, is moved in the axial direction of the drum at a predetermined feed speed. Thus, the wrapper 40 can be readily cut in a gentle curve along the blade groove 35c, 36c.

(9) The wrapper cutting mechanism 44 is provided with the cutter 159 which engages the blade grooves 35c, 36c of the drums 35, 36. Therefore, even with the body ply materials 46A, 46B made of non-metal fiber or metal fiber, the wrapper 40 on the drum 35, 36 can be cut to form the body ply materials 46A, 46B having a predetermined width dimension with clear cut surfaces in cooperation of the blade grooves 35c, 36c with the discoidal cutter 159.

(10) The wrappers on a plurality of drums having different peripheral length M dimensions are cut at one location in the longitudinal direction of the drums, respectively, to produce two body ply materials having different width dimensions for use in one tire. It is therefore possible to produce the body ply materials 46A, 46B having different width dimensions.

(11) When the wrapper on one drum is cut at two locations in the longitudinal direction of the drum to produce two body ply materials for use in one tire, the wrapper is cut at two locations such that the two body ply materials have different width dimensions from each other. Therefore, the body ply materials 46A, 46B different in width dimension can be produced with one drum.

(12) Since the finish end of the ribbon wound on the drum is cut at a right angle to the longitudinal direction of the ribbon, a corner of the body ply material 46A can be formed at a right angle by defining that portion as a cutting reference point.

(13) Since the wrapper is cut along a gentle curve which is substantially orthogonal to the longitudinal direction of the ribbon wound on the drum, the linear cords 39a can be embedded in parallel with the longitudinal direction of a body ply material, which is a product, thereby making it possible to improve the reliability by correctly orienting the linear cords 39a in the radial direction in a tire.

(14) Since the wrapper is cut along the gentle curve which passes the winding start end and winding finish end of the ribbon, the corner of the body ply material can be formed at a right angle.

(15) Since the wrapper cutting mechanism 44 comprises the roller 160 for pressing the wrapper ahead of the cutter 159, the wrapper can be cut without fail.

(16) The body ply material peeling mechanism 47 is provided for peeling the body ply materials 46A, 46B formed by cutting the wrapper 40 from the outer periphery of the drum 35, 36. It is therefore possible to sequentially and smoothly peel the cut body ply materials 46A, 46B from the outer periphery of the drum 35, 36.

(17) The tray transporting mechanism 48 is provided for transporting the tray 50 for receiving and supporting the body ply materials 46A, 46B peeled from the outer periphery of the drum 35, 36 in a direction which intersects the axial line of the drum 35, 36. Thus, as the tray 50 is transported by the tray transporting mechanism 48 in the direction intersecting the axial line of the drum 35, 36, the body ply materials 46A, 46B peeled from the drum 35, 36 can be extended and supported on the tray 50 such that they are transferred to predetermined positions on the tray 50.

(18) The pair of drums 35, 36 formed with the blade grooves 35c, 36c are rotatably supported on the drum reversing/supporting mechanism 34, so that the drums 35, 36 are alternately reversed to the two upper and lower positions. Then, the ribbon 39 formed of a plurality of linear cords 39a covered with the rubber coating 39b is wound on the outer periphery of the drum 35, 36 placed at the upper position to form the wrapper 40 by the ribbon winding mechanism 38. In addition, the wrapper 40 on the outer periphery of the drum 35, 36 placed at the lower position is cut by the wrapper cutting mechanism 44 along the blade groove 35c, 36c of the drum 35, 36 to form the body ply materials 46A, 46B.

Thus, the body ply materials 46A, 46B made of non-metal fiber or metal fiber can be readily produced by using the ribbon 39 formed of a plurality of linear cords 39a made of non-metal fiber or metal fiber, and winding the ribbon 39 on the outer periphery of the drum 35, 36. Also, as the pair of drums 35, 36 are alternately reversed to the two upper and lower positions, the ribbon 39 is wound on the drum 35, 36 placed at the upper position to form the wrapper 40, and the wrapper 40 on the drum 36, 35 placed at the lower position is cut, thereby making it possible to improve the production efficiency of the body ply materials 46A, 46B.

(19) The body ply material peeling mechanism 47 comprises the scraper 163 for partially peeling the cut edge of the body ply material following the cutting of the wrapper; and the rotating peeling bar 175 for introducing into the gap G of the cut edge, formed by a peeling tool, to transfer the body ply material onto the tray 50. It is therefore possible to perform the peeling operation without fail.

(20) Since the tray transporting mechanism 48 comprises a pressing force adjusting mechanism for adjusting a pressing force of the tray to the drum, the body ply material 46A can be properly peeled and transferred onto the top surface of the tray 50.

(21) Since the drums 35, 36 comprise the drum diameter changing mechanism 53 for enlarging and reducing their outer diameters, body ply materials different in width can be produced on the same drum, thereby making it possible to improve the work efficiency.

(Exemplary Modifications)

This embodiment can also be modified and embodied in the following manner.

Figure 25A:
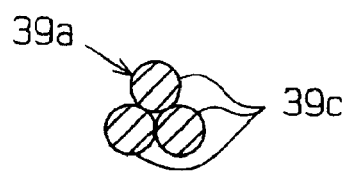
FIGS. 25(a) to 25(c) are cross-sectional views illustrating a process of manufacturing cords for use in a ribbon.
Figure 25B:
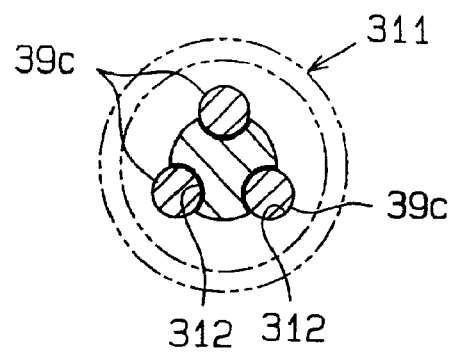
Figure 25C:
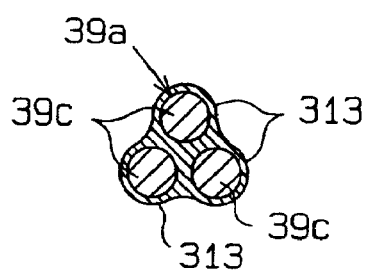
Figure 26:
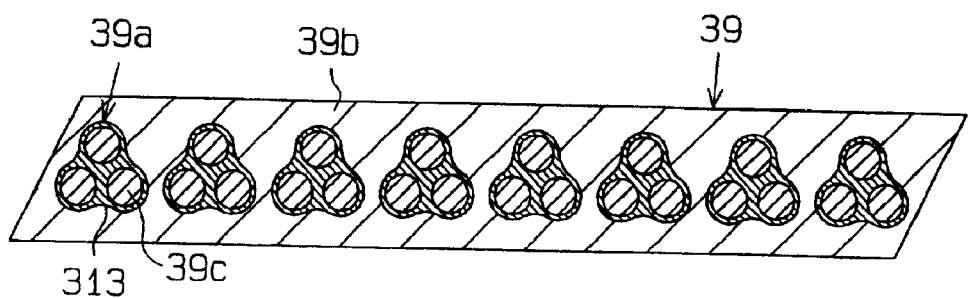
FIG. 26 is a cross-sectional view of the ribbon.

As illustrated in FIG. 25(a), the cords 39a made of a plurality of twisted filaments 39c is passed through a separation throughholes 312 of a twist-back member 311 and transferred in the longitudinal direction as illustrated in FIG. 25(b), to twist back the respective filaments 39c and form predetermined spacings between them. In this state, the cords 39a are passed through softened rubber, not shown, to form a rubber layer 313 around the outer periphery of the respective filaments 39c, as illustrated in FIG. 35(c). After the respective filaments 39c substantially return to the original twisted state by their own twisting stresses, a plurality of cords 39a, fabricated in a similar manner to the foregoing, are arranged in parallel and passed through a rubber extruder, not shown. Then, as illustrated in FIG. 26, the rubber layer 313 of each cord 39a is flattened by a rubber coating 39b to form a ribbon 39.

The linear cord 39a coated with the rubber layer 313, provided in the foregoing manner, can have a predetermined stress to an external force or the like, and ensure a sufficient stickiness to the rubber coating 39b. Also, since the overall outer periphery of the rubber layer 313 is coated with the rubber coating 39b after the outer periphery of each filament 39c is coated with the rubber layer 313, moisture can be prevented from reaching each filament 39c to improve the anticorrosive property. Further, since the respective filaments 39c are in contact with one another through the liquid rubber layer 313, a good vibration absorption is provided, and the respective filaments can be prevented from directly coming into frictional contact with one another to generate frictional heat.

Only one drum may be mounted on the frame to produce the body ply materials 46A, 46B.

A relative movement mechanism may be provided for relatively moving the drums 35, 36 and the ribbon winding guide 120 at a predetermined feed speed in the axial directions of the drums.

As compared with the foregoing embodiment in which the ribbon winding guide 120 is moved in the longitudinal directions of the drums while the drums are maintained at predetermined position, where the drums having large weights are moved, the power can be reduced, and the longitudinal dimension of the device can be limited.

The drums 35, 36 are held unrotated, and the cutter 159 is moved along the blade grooves 35c, 36c, which present gentle curves which is substantially orthogonal to the longitudinal direction of the ribbon wound on the drum to cut the wrapper 40.

The wrapper cutting mechanism 44 may be comprised of a cutter provided for movements into contact with and away from the drums and for cutting the wrapper, and a relative movement mechanism for relatively moving the cutter in the axial directions of the drums at a predetermined feed speed.

The blade grooves of the drums may be omitted, and the wrapper is cut by a cutting mechanism along a scheduled cutting line. In this case, it is contemplated that the pivotal movements of the drums and the movement of the cutter may be performed by a numerical control of motors and cylinders, and a rotating saw tooth is used as the cutter.

One or a plurality of drums can be switched among a ribbon winding position, a ribbon bonding position, a wrapper cutting position, and a body ply material peeling/extracting position by a position switching mechanism.

The process of bonding the ribbon 39 by the presser roller 128 is omitted, so that the lateral edges of the ribbon is bonded to each other by the ribbon winding mechanism 38 through its operation for winding the ribbon 39. In this case, the ribbon winding mechanism 38 itself functions as a ribbon bonding mechanism.

The winding length L of the wrapper 40 is set identical to the length dimension L1 of the body ply materials 46A, 46B, such that after the process of manufacturing the wrapper, the wrapper is cut at one location or a plurality of locations in the longitudinal direction of the drum to produce the body ply materials for one tire or a plurality of tires.

As a winding start end grabbing mechanism, a mechanism is used for clamping the distal end of the ribbon moved to the outer peripheral surface of the drum, and stopping the distal end with an adhesive or a stopper protrusion.

The drum diameter changing mechanism 53 may be omitted from the drums 35, 36.

In FIG. 9, the ribbon winding guide 120 is originally moved down to the active position, without stopping the same at the preparatory position such that the distal end of the ribbon 39 is grabbed by the drum 35.

The ribbon 39 may be formed to have the shape of oblong rectangle in cross-section.

In the producing device of the foregoing embodiment, the specific structures may be modified as appropriate for the drum reversing/supporting mechanism 34, drum clamp mechanism 37, ribbon winding mechanism 38, ribbon cutting mechanism 41, wrapper cutting mechanism 44, body ply material peeling mechanism 47, and tray transporting mechanism 48.

What is claimed is:

1. A device for producing a body ply material for a pneumatic tire, comprising:

a ribbon manufacturing device for manufacturing a ribbon of a predetermined width dimension in the form of a cord having a rubber covering applied thereto;

a ribbon winding mechanism for spirally winding said ribbon on an outer peripheral surface of a drum; and a bonding mechanism for bonding lateral edges of the ribbon to manufacture a wrapper;

a peripheral length dimension of the outer peripheral surface of said drum being set equal to or integral multiples of a width dimension of a body ply material for use in a tire;

a winding length in a drum longitudinal direction of said wrapper being set equal to a length dimension of said body ply material for use in a tire;

a wrapper cutting mechanism for cutting said wrapper along a gentle curve which is substantially orthogonal to the longitudinal direction of the ribbon to form the body ply material of a predetermined width dimension;

a body ply material peeling mechanism for peeling the body ply material from the drum; and a tray for receiving and supporting the body ply material peeled from the drum, said tray having a plurality of vacuum pads for adsorbing the peeled body ply material on the tray and being transported to a direction intersecting the axial line of the drum by a tray transporting mechanism;

wherein said body poly material peeling mechanism comprises a peeling tool for partially peeling an edge of a cut body ply material, following cutting of the wrapper, and a rotating peeling bar entering a gap of the cut edge, formed by the peeling tool, to transfer the body ply material onto the tray.

2. The device for producing a body ply material for a tire according to claim 1, wherein said ribbon winding mechanism comprises a ribbon winding guide corresponding to the drum rotatably supported by a frame, and a relative movement mechanism for relatively moving said drum and said ribbon winding guide in an axial direction of the drum at a predetermined feed speed.

3. The device for producing a body ply material for a tire according to claim 2, wherein start end holding mechanism capable of holding a winding start end of the ribbon is provided for the drum.

4. The device for producing a body ply material for a tire according to claim 2, wherein said ribbon winding mechanism comprises a ribbon cutting mechanism for cutting a winding finish end of the ribbon wound on the drum.

5. The device for producing a body ply material for a tire according to claim 1, wherein said wrapper cutting mechanism comprises a cutter disposed corresponding to said drum for movements into contact with and away from the drum, and a moving mechanism for moving said cutter along a gentle curve which is substantially orthogonal to the longitudinal direction of the ribbon wound on the drum, while holding said drum in a non-rotating state.

6. The device for producing a body ply material for a tire according to claim 1, wherein said wrapper cutting mechanism is configured to move the cutter disposed corresponding to said drum for movements into contact with and away from the drum in a direction parallel with the axial direction of the drum, and slowly pivoting said drum to cut the wrapper along the gentle curve which is substantially orthogonal to the longitudinal direction of the ribbon wound on the drum.

7. The device for producing a body ply material for a tire according to claim 4, wherein a blade groove is provided on the outer peripheral surface of the drum for cutting said wrapper along a gentle curve which is substantially orthogonal to the longitudinal direction of the ribbon wound on the drum, wherein a blade edge of said cutter is guided by one edge of said blade groove to cut the wrapper.

8. The device for producing a body ply material for a tire according to claim 1, wherein said body ply material peeling mechanism is configured to transfer the body ply material on said tray which is moving in a transporting direction, while peeling the body ply material from the drum in a rotating state.

9. The device for producing a body ply material for a tire according to claim 1, wherein said device has said drum and additional drums, said drum and additional drums being disposed at a plurality of locations, and each of said drum and additional drums is configured to be switchable among a ribbon winding position, a ribbon bonding position, a wrapper cutting position, and a body ply material peeling position by a position switching mechanism.

10. The device for producing a body ply material for a tire according to claim 1, wherein said drum comprise a drum diameter changing mechanism for enlarging and reducing outer diameters thereof.

11. The device for producing a body ply material for a tire according to claim 9, comprising:

a drum reversing/supporting mechanism for rotatably supporting a pair of drums having the same outer diameter, and formed with a blade groove, and functioning as a position switching mechanism for alternately reversing said pair of drums to two positions, wherein a ribbon is wound on the outer periphery of one of the pair of drums placed at one position by the drum reversing/supporting mechanism to form a wrapper, and said wrapper on the outer periphery of the one of the pair of drums reversed to the other position by said drum reversing/supporting mechanism is cut along the blade groove of the drum to form a body ply material.

12. The device for producing a body ply material for a tire according to claim 5, wherein said wrapper cutting mechanism comprises a roller for pressing the wrapper ahead of said cutter.

13. The device for producing a body ply material for a tire according to claim 1, wherein said tray transporting mechanism comprises a pressing force adjusting mechanism for adjusting a pressing force of the tray to the drum.

14. The device for producing a body ply material for a tire according to claim 1, wherein said ribbon winding mechanism is configured to perform a winding operation for the drum in an outgoing stroke and a returning stroke of reciprocal movements in a direction parallel with the axial direction of the drum.

* * * * *